US012396909B2

(12) United States Patent
Lim et al.

(10) Patent No.: US 12,396,909 B2
(45) Date of Patent: Aug. 26, 2025

(54) SURGICAL PLATFORM SYSTEM

(71) Applicant: Warsaw Orthopedic, Inc., Warsaw, IN (US)

(72) Inventors: Roy K. Lim, Memphis, TN (US); Katharine E. Darling, Louisville, CO (US); Mark C. Dace, Memphis, TN (US)

(73) Assignee: Warsaw Orthopedic, Inc., Warsaw, IN (US)

( * ) Notice: Subject to any disclaimer, the term of this patent is extended or adjusted under 35 U.S.C. 154(b) by 447 days.

(21) Appl. No.: 17/897,356

(22) Filed: Aug. 29, 2022

(65) Prior Publication Data

US 2024/0065912 A1 Feb. 29, 2024

(51) Int. Cl.
*A61G 13/08* (2006.01)
*A61G 13/00* (2006.01)
(Continued)

(52) U.S. Cl.
CPC ......... *A61G 13/08* (2013.01); *A61G 13/0054* (2016.11); *A61G 13/04* (2013.01); (Continued)

(58) Field of Classification Search
CPC ........ A61G 13/00; A61G 13/04; A61G 13/08; A61G 13/0054; A61G 13/06; A61G 13/104; A61G 13/1205; A61G 2200/325
See application file for complete search history.

(56) References Cited

U.S. PATENT DOCUMENTS 2,691,979 A 10/1954 Watson
3,060,925 A 10/1962 Honsaker et al.
(Continued)

FOREIGN PATENT DOCUMENTS

CN 110025380 7/2019
EP 3158986 4/2017
(Continued)

OTHER PUBLICATIONS

International Search Report and Written Opinion dated Jul. 19, 2023 in PCT/IB2023/054288.
(Continued)

*Primary Examiner* — Fredrick C Conley
(74) *Attorney, Agent, or Firm* — Womble Bond Dickinson (US) LLP

(57) ABSTRACT

A surgical platform system facilitating manipulation of a patient support thereby is provided. The surgical platform system can include a support supporting a linkage portion, a first platform portion, and a second platform portion relative to the ground. The linkage portion can include a base pivotally attached to the support, a first connector pivotally supported by the base, and a first support portion and a second support portion pivotally supported by the first connector. The first platform portion can be supported by the first support portion and the second support portion, and the second platform can be supported by the base. Pivotal movement of the first platform portion relative to the base via pivotal movement of the connector, and pivotal movement of the second platform portion relative to the support via pivotal movement of the base can serve to separately articulate the first platform portion and the second platform portion relative to one another.

20 Claims, 24 Drawing Sheets

(51) Int. Cl.

*A61G 13/04* (2006.01)
*A61G 13/06* (2006.01)
*A61G 13/10* (2006.01)
*A61G 13/12* (2006.01)

(52) U.S. Cl.

CPC ........... *A61G 13/06* (2013.01); *A61G 13/104* (2013.01); *A61G 13/1205* (2013.01); *A61G 2200/325* (2013.01)

(56) References Cited

U.S. PATENT DOCUMENTS 3,227,440 A 1/1966 Scott
3,293,667 A 12/1966 Ohrberg
3,306,287 A 2/1967 Arp
3,389,702 A 6/1968 Kennedy
3,828,377 A 8/1974 Fary, Sr.
4,029,089 A 6/1977 Mulhlland
4,194,257 A 3/1980 Martin et al.
4,627,119 A 12/1986 Hachey et al.
4,655,200 A 4/1987 Knight
4,705,026 A 11/1987 Chaussy
4,866,796 A 9/1989 Robinson
4,872,656 A 10/1989 Brendgord
4,901,384 A 2/1990 Eary
4,915,101 A 4/1990 Cuccia
5,009,407 A 4/1991 Watanabe
5,013,018 A 5/1991 Sicek
5,088,706 A 2/1992 Jackson
5,103,511 A 4/1992 Sequin
5,131,106 A 7/1992 Jackson
5,362,302 A 11/1994 Jenson et al.
5,390,383 A 2/1995 Carn
5,410,769 A 5/1995 Waterman
5,444,882 A 8/1995 Andrews
5,564,662 A 10/1996 Lussi et al.
5,613,254 A 3/1997 Clayman
5,642,302 A 6/1997 Dumont
5,860,899 A 1/1999 Rassman
5,991,651 A 11/1999 LaBarbera
6,003,176 A 12/1999 Wasley
6,076,525 A 6/2000 Hoffman
6,112,349 A 9/2000 Connolly
6,154,901 A 12/2000 Carr
6,260,220 B1 7/2001 Lamb
6,295,671 B1 10/2001 Reesby et al.
6,311,349 B1 11/2001 Kazakia
6,367,104 B1 4/2002 Fallbo, Sr. et al.
6,378,149 B1 4/2002 Sanders et al.
6,516,483 B1 2/2003 VanSteenburg
6,566,833 B2 5/2003 Barlett
6,615,430 B2 9/2003 Heimbrock
6,671,905 B2 1/2004 Bartlett et al.
6,681,423 B2 * 1/2004 Zachrisson .......... A61G 13/121 5/601
6,701,553 B1 3/2004 Hand et al.
6,701,554 B2 3/2004 Heimbrock
6,701,558 B2 3/2004 VanSteenburg
6,715,169 B2 4/2004 Niederkrom
6,728,983 B2 5/2004 Bartlett et al.
6,732,390 B2 5/2004 Krywiczanin
6,739,006 B2 5/2004 Borders et al.
6,820,621 B2 11/2004 DeMayo
6,874,181 B1 4/2005 Connolly et al.
6,934,986 B2 8/2005 Krywiczanin et al.
6,941,951 B2 9/2005 Hubert et al.
6,966,081 B1 11/2005 Sharps
7,100,225 B1 9/2006 Bailey
7,152,261 B2 12/2006 Jackson
7,189,214 B1 3/2007 Saunders
7,219,379 B2 5/2007 Krywiczanin et al.
7,234,180 B2 6/2007 Horton et al.
7,290,302 B2 11/2007 Sharps
7,343,635 B2 3/2008 Jackson
7,426,930 B1 9/2008 Bailey
7,472,440 B2 1/2009 Bartlett et al.
7,484,253 B1 2/2009 Coppens
7,496,980 B2 3/2009 Sharps
7,565,708 B2 7/2009 Jackson
7,600,281 B2 10/2009 Skripps
7,669,262 B2 3/2010 Skripps
7,739,762 B2 6/2010 Lamb et al.
7,882,583 B2 2/2011 Skripps
8,060,960 B2 11/2011 Jackson
8,118,029 B2 2/2012 Gneiting et al.
8,286,283 B2 10/2012 Copeland et al.
8,286,637 B2 10/2012 Kaska
8,381,331 B2 2/2013 Sharps et al.
8,381,335 B2 2/2013 Ahlman
8,413,660 B2 4/2013 Weinstein et al.
8,424,133 B1 * 4/2013 Rossi ..................... A61G 13/04 5/607
8,439,948 B1 5/2013 King
8,443,473 B2 5/2013 Maxwell
8,584,281 B2 11/2013 Diel et al.
8,635,725 B2 1/2014 Tannoury et al.
8,677,529 B2 3/2014 Jackson
8,707,484 B2 4/2014 Jackson et al.
8,978,180 B2 3/2015 Jackson
9,072,646 B2 7/2015 Skripps et al.
9,180,062 B2 11/2015 Jackson
9,186,291 B2 11/2015 Jackson et al.
9,226,865 B2 1/2016 Jackson et al.
9,265,680 B2 2/2016 Sharps
9,295,433 B2 3/2016 Jackson et al.
9,308,145 B2 4/2016 Jackson
9,339,430 B2 5/2016 Jackson et al.
9,358,170 B2 6/2016 Jackson
9,402,775 B2 8/2016 Jackson et al.
9,414,982 B2 8/2016 Jackson
9,468,576 B2 10/2016 Jackson
9,498,397 B2 11/2016 Hight et al.
9,522,078 B2 12/2016 Pizzini
9,554,959 B2 1/2017 Carn
9,622,928 B2 4/2017 Jackson et al.
9,642,760 B2 5/2017 Jackson et al.
9,655,793 B2 5/2017 Hertz
9,700,476 B2 7/2017 Hoel et al.
9,713,562 B2 7/2017 Perlman et al.
9,744,089 B2 8/2017 Jackson
9,849,054 B2 12/2017 Jackson
9,937,006 B2 4/2018 Skripps et al.
9,993,380 B2 6/2018 Jackson
10,136,863 B2 11/2018 Kaiser et al.
10,314,758 B2 6/2019 Dolliver et al.
10,342,722 B2 7/2019 Garrido
10,383,779 B2 * 8/2019 Koch ..................... A61G 13/06
RE47,588 E 9/2019 Erbel et al.
10,406,054 B1 9/2019 Scholl et al.
10,426,684 B2 10/2019 Dubois et al.
10,492,973 B2 12/2019 Drake
10,531,998 B2 1/2020 Jackson et al.
10,543,142 B2 1/2020 Lim et al.
10,548,796 B2 2/2020 Lim et al.
10,576,006 B2 3/2020 Lim et al.
10,695,252 B2 6/2020 Jackson
10,722,413 B2 7/2020 Lim et al.
10,729,607 B2 8/2020 Jackson
10,751,240 B2 8/2020 Lim et al.
10,835,438 B2 11/2020 Jackson
10,835,439 B2 11/2020 Lim et al.
10,849,809 B2 12/2020 Lim et al.
10,874,570 B2 12/2020 Lim et al.
10,881,570 B2 1/2021 Lim et al.
10,888,484 B2 1/2021 Lim et al.
10,893,996 B2 1/2021 Lim et al.
10,898,401 B2 1/2021 Lim et al.
10,900,448 B2 1/2021 Lim et al.
11,452,656 B2 * 9/2022 Campbell .............. A61G 13/04
2002/0138905 A1 10/2002 Barltett et al.
2002/0138906 A1 10/2002 Barltett et al.
2002/0157186 A1 10/2002 VanSteenburg
2003/0140419 A1 7/2003 Bartlett et al.
2003/0140420 A1 7/2003 Niederkrom

(56) References Cited

U.S. PATENT DOCUMENTS

| | | | |
|---|---|---|---|
| 2003/0145382 A1 | 8/2003 | Krywiczanin | |
| 2003/0178027 A1 | 9/2003 | DeMayo et al. | |
| 2004/0010849 A1 | 1/2004 | Krywiczanin et al. | |
| 2004/0133979 A1 | 7/2004 | Newkirk et al. | |
| 2004/0133983 A1 | 7/2004 | Newkirk | |
| 2005/0015878 A1* | 1/2005 | Bannister | A61G 13/06 5/618 |
| 2005/0181917 A1 | 8/2005 | Dayal | |
| 2006/0037141 A1 | 2/2006 | Krywiczanin et al. | |
| 2006/0123546 A1 | 6/2006 | Horton | |
| 2006/0162076 A1 | 7/2006 | Bartlett et al. | |
| 2006/0162084 A1 | 7/2006 | Mezue | |
| 2006/0185090 A1 | 8/2006 | Jackson | |
| 2006/0185091 A1 | 8/2006 | Jackson | |
| 2007/0107125 A1 | 5/2007 | Koch et al. | |
| 2008/0034502 A1 | 2/2008 | Copeland et al. | |
| 2008/0134434 A1 | 6/2008 | Celauro | |
| 2008/0222811 A1 | 9/2008 | Gilbert et al. | |
| 2009/0070936 A1 | 3/2009 | Henderson | |
| 2009/0139030 A1 | 6/2009 | Yang | |
| 2009/0248041 A1 | 10/2009 | Williams et al. | |
| 2010/0037397 A1 | 2/2010 | Wood | |
| 2010/0192300 A1 | 8/2010 | Tannoury | |
| 2010/0293713 A1 | 11/2010 | Sharps | |
| 2010/0293719 A1 | 11/2010 | Klemm et al. | |
| 2011/0099716 A1 | 5/2011 | Jackson | |
| 2011/0107516 A1 | 5/2011 | Jackson et al. | |
| 2011/0152931 A1 | 6/2011 | Zhang et al. | |
| 2012/0103344 A1 | 5/2012 | Hunter | |
| 2012/0144589 A1 | 6/2012 | Skripps et al. | |
| 2012/0255122 A1 | 10/2012 | Diel et al. | |
| 2013/0111666 A1 | 5/2013 | Jackson | |
| 2013/0191994 A1 | 8/2013 | Bellows et al. | |
| 2013/0283526 A1 | 10/2013 | Gagliardi | |
| 2013/0307298 A1 | 11/2013 | Meiki | |
| 2014/0020183 A1 | 1/2014 | Dominick | |
| 2014/0059773 A1 | 3/2014 | Carn | |
| 2014/0068861 A1 | 3/2014 | Jackson | |
| 2014/0109316 A1 | 4/2014 | Jackson et al. | |
| 2014/0130258 A1 | 5/2014 | Kobuss | |
| 2014/0137327 A1 | 5/2014 | Tannoury et al. | |
| 2015/0038982 A1 | 2/2015 | Kilroy et al. | |
| 2015/0044956 A1 | 2/2015 | Hacker | |
| 2015/0245969 A1 | 9/2015 | Hight et al. | |
| 2015/0245971 A1 | 9/2015 | Bernardoni et al. | |
| 2015/0272681 A1 | 10/2015 | Skripps et al. | |
| 2016/0000621 A1 | 1/2016 | Jackson | |
| 2016/0081582 A1 | 3/2016 | Rapoport | |
| 2016/0089287 A1 | 3/2016 | Buerstner | |
| 2016/0193099 A1 | 7/2016 | Drake | |
| 2016/0317373 A1 | 11/2016 | Jackson et al. | |
| 2016/0331477 A1 | 11/2016 | Yu et al. | |
| 2017/0027797 A1 | 2/2017 | Dolliver et al. | |
| 2017/0049651 A1 | 2/2017 | Lim | |
| 2017/0049653 A1 | 2/2017 | Lim | |
| 2017/0079864 A1 | 3/2017 | Riley | |
| 2017/0112698 A1 | 4/2017 | Hight et al. | |
| 2017/0135891 A1 | 5/2017 | Kettner | |
| 2017/0151115 A1 | 6/2017 | Jackson | |
| 2017/0341232 A1 | 11/2017 | Perplies | |
| 2017/0348171 A1 | 12/2017 | Jackson | |
| 2018/0116891 A1 | 5/2018 | Beale et al. | |
| 2018/0185106 A1 | 7/2018 | Itkowitz et al. | |
| 2018/0185228 A1 | 7/2018 | Catacchio et al. | |
| 2018/0193104 A1 | 7/2018 | Beale et al. | |
| 2018/0207044 A1 | 7/2018 | Sabet et al. | |
| 2018/0222044 A1 | 8/2018 | Guerrera et al. | |
| 2018/0363596 A1 | 12/2018 | Lim et al. | |
| 2019/0000702 A1 | 1/2019 | Lim et al. | |
| 2019/0000707 A1 | 1/2019 | Lim et al. | |
| 2019/0029906 A1 | 1/2019 | Konsin et al. | |
| 2019/0046381 A1 | 2/2019 | Lim et al. | |
| 2019/0046383 A1 | 2/2019 | Lim et al. | |
| 2019/0209409 A1 | 7/2019 | Jackson et al. | |
| 2019/0374420 A1 | 12/2019 | Lehman et al. | |
| 2020/0000668 A1 | 1/2020 | Lim et al. | |
| 2020/0060913 A1 | 2/2020 | Lim et al. | |
| 2020/0060914 A1 | 2/2020 | Lim et al. | |
| 2020/0060915 A1 | 2/2020 | Lim et al. | |
| 2020/0138659 A1 | 5/2020 | Lim et al. | |
| 2020/0138660 A1 | 5/2020 | Jackson | |
| 2020/0170868 A1 | 6/2020 | Jackson | |
| 2020/0188208 A1 | 6/2020 | Lim et al. | |
| 2020/0268369 A1 | 8/2020 | Stanton | |
| 2020/0281788 A1 | 9/2020 | Lim et al. | |
| 2020/0297568 A1 | 9/2020 | Lim et al. | |
| 2020/0337923 A1 | 10/2020 | Lim et al. | |
| 2020/0337926 A1 | 10/2020 | Lim et al. | |
| 2020/0337927 A1 | 10/2020 | Lim et al. | |
| 2020/0360214 A1 | 11/2020 | Lim et al. | |
| 2021/0106391 A1 | 4/2021 | Gregerson et al. | |
| 2022/0008016 A1 | 1/2022 | Harrison et al. | |
| 2022/0409311 A1 | 12/2022 | Tadano et al. | |

FOREIGN PATENT DOCUMENTS

| | | |
|---|---|---|
| EP | 3434248 | 1/2019 |
| EP | 3909539 | 11/2021 |
| JP | 2018069048 | 5/2018 |
| JP | 6449958 | 12/2018 |
| WO | WO0062731 | 10/2000 |
| WO | 2007058673 | 5/2007 |
| WO | 2019067028 | 4/2019 |
| WO | 2021176531 | 9/2021 |

OTHER PUBLICATIONS

International Search Report and Written Opinion dated Jun. 27, 2023 in PCT/IL2023/050291.

International Search Report and Written Opinion dated Jul. 20, 2023 in PCT/IB2023/054218.

International Search Report and Written Opinion dated Jul. 20, 2023 in PCT/IB2023/054786.

International Search Report and Written Opinion dated Oct. 18, 2023 in PCT/IB2023/058416.

* cited by examiner

SURGICAL PLATFORM SYSTEM

FIELD

The present technology generally relates to a surgical platform system having a first platform portion and a second platform portion that can be used to adjust portions of a patient supported thereby before, during, and after surgery in relation to a surgical robotic system.

BACKGROUND

Typically, conventional surgical tables include some form of patient articulation, but such patient articulation afforded thereby is often quite limited. For example, sometimes the conventional surgical tables can afford a limited degree of flexion or extension of the spine of the patient by lifting a portion of the torso of the patient in a upward direction and a downward direction. The patient articulation afforded by the convention surgical tables is limited because portions thereof supporting portions of the patient are typically not separately articulatable to any great degree. For example, portions of the conventional surgical tables supporting the heads and the torsos of the patient and other portions of the conventional surgical tables supporting the legs of the patient are not typically separately articulatable relative to one another in a fashion that affords any great degree of flexion and extension via such articulation. Therefore, in order to enhance patient articulation, there is a need for a surgical platform system including a first platform portion and a second platform portion that are at least in part separately articulatable relative to one another to afford separate articulation of a first portion of the patient supported by the first platform portion and a second portion of the patient supported by the second platform portion. Such a surgical platform system incorporating the first platform portion and the second platform portion separately articulatable relative to one another can correspondingly position/orient and reposition/reorient a first portion of the patient's body supported by the first platform portion, and a second portion of the patient's body supported by the second platform portion with respect to one another. Portions of the surgical platform system can be attached relative to and/or integrated with a surgical robotic system to afford positioning and repositioning the patient's body relative thereto before, during, and after surgery.

SUMMARY

The techniques of this disclosure generally relate to a surgical platform system that can be used as a surgical table for performing surgery on a patient supported thereby, with a first platform portion and a second platform portion of the surgical platform system capable of supporting a first portion and a second portion, respectively, of the patient thereon. The first platform portion and the second platform portion can be separately articulatable relative to one another, and portions of the surgical platform system can be integrated with a surgical robotic system to afford positioning/orienting and repositioning/reorienting the patient's body relative to the surgical robot before, during, and after surgery.

In one aspect, the present disclosure provides a surgical platform system facilitating manipulation of a patient supported thereby, the surgical platform system including a support portion including a horizontally-oriented portion and a vertically-oriented portion, the horizontally-oriented portion having a first end, an opposite second end, a first end portion at the first end, a second end portion at the second end, and a cross member extending between the first end portion and the second end portion, and the vertically-oriented portion including a column portion supported by the horizontally-oriented portion, the column portion spacing a first platform portion, a second platform portion, and a linkage portion of the surgical platform system from the horizontally-oriented portion, the linkage portion including a first base portion positioned on a first side of the column portion, a second base portion positioned on a second side of the column portion, a first connector extending between the first base portion and the second base portion, and a first support portion and a second support portion supported at least in part by the first connector, the first base portion and the second base portion being pivotally attached relative to the column portion, and the second platform portion being supported by the first base portion and the second base portion, the first connector having a first end and an opposite second end, the first end of the first connector being pivotally attached relative to the first base portion and the second base portion, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion; the first platform portion including first patient support portions for supporting portions of the patient's head and upper torso; and the second platform portion including second patient support portions for supporting portions of the patient's legs; where the first platform portion is pivotal relative to the first base portion and the second base portion via pivotal movement of the first connector; where the second platform portion is pivotal relative to the column portion via pivotal movement of the first base portion and the second base portion; and where the pivotal movement of the first platform portion relative to the first base portion and the second base portion, and pivotal movement the second platform portion relative to the column portion serves to separately articulate the first platform portion and the second platform portion relative to one another.

In another aspect, the present disclosure provides a surgical platform system facilitating manipulation of a patient supported thereby, the surgical platform system including a horizontally-oriented portion and a vertically-oriented portion, the horizontally-oriented portion supporting the vertically-oriented portion, and the vertically-oriented portion spacing a first platform portion, a second platform portion, and a linkage portion of the surgical platform system from the horizontally-oriented portion, the linkage portion including a base pivotally attached to the vertically-oriented portion, a first connector supported by the base, and a first support portion and a second support portion supported at least in part by the first connector, the second platform portion being supported by the base, the first connector having a first end and an opposite second end, the first end of the first connector being pivotally attached relative to the base, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion; the first platform portion including first patient support portions for supporting portions of the patient's head and upper torso; and the second platform portion including second patient support portions for supporting portions of the patient's legs; where the first platform portion is pivotal relative to the base via pivotal movement of the first connector; where the second platform portion is pivotal relative to the column portion via pivotal movement of the base; and where the pivotal movement of the first platform portion relative to the base, and pivotal movement of the second platform portion relative to the column portion serves to separately articulate the first platform portion and the second platform portion relative to one another.

In yet another aspect, the present disclosure provides a surgical platform system facilitating manipulation of a patient supported thereby, the surgical platform system including a support supporting a linkage portion, a first support platform, and a second support platform relative to the ground, the linkage portion including a base pivotally attached to the support, a first connector supported by the base, and a first support portion and a second support portion supported at least in part by the first connector, the second platform portion being supported by the base, the first connector having a first end and an opposite second end, the first end of the first connector being pivotally attached relative to the base, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion; the first platform portion including first patient support portions for supporting portions of the patient's head and upper torso; and the second platform portion including second patient support portions for supporting portions of the patient's legs; where the first platform portion is pivotal relative to the base via pivotal movement of the first connector; where the second platform portion is pivotal relative to the support via pivotal movement of the base; and where the pivotal movement of the first platform portion relative to the base, and pivotal movement of the second platform portion relative to the support serves to separately articulate the first platform portion and the second platform portion relative to one another.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The techniques of this disclosure generally relate to a surgical platform system.

DETAILED DESCRIPTION

Figure 1:
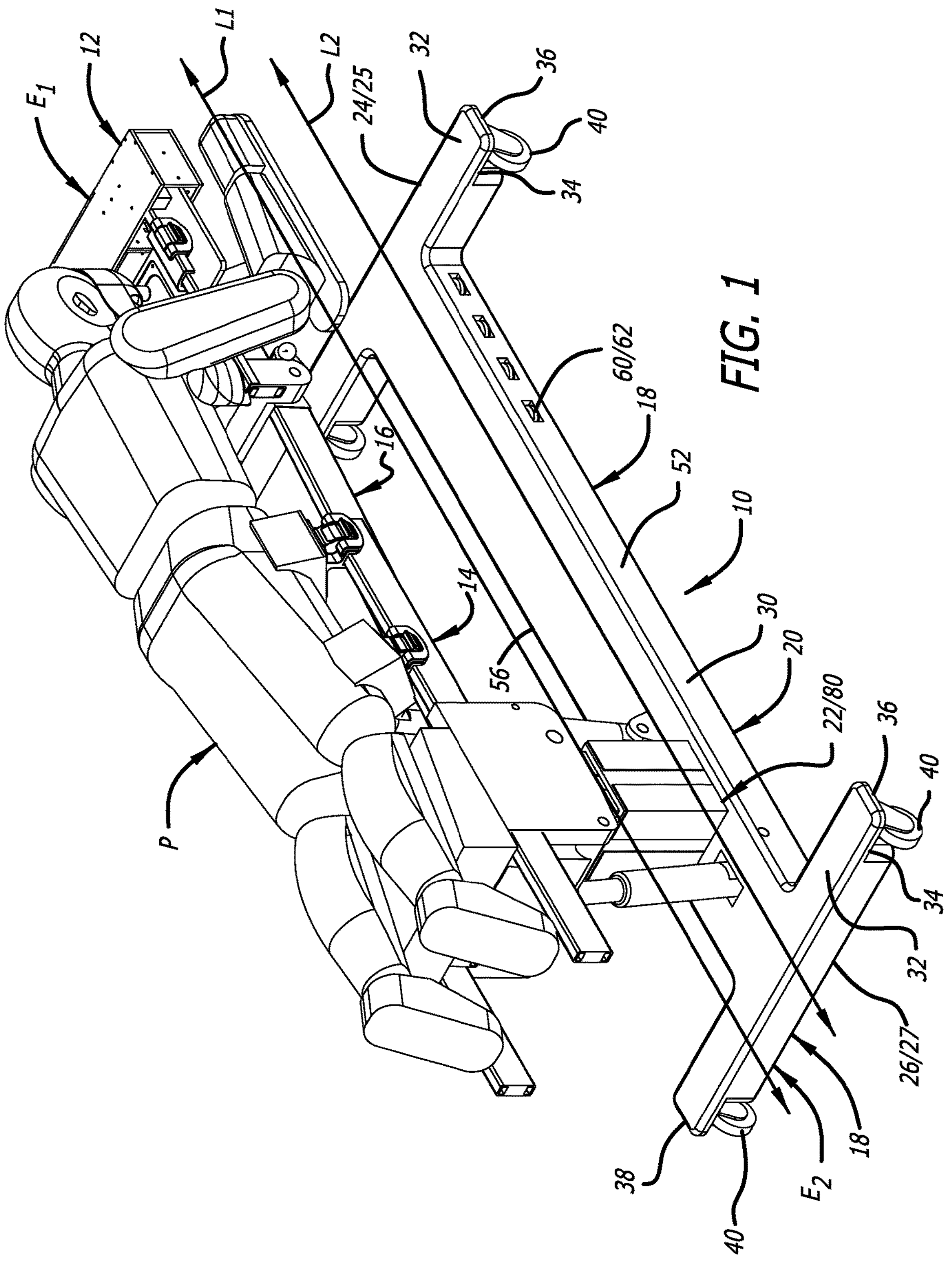
FIG. 1 is a top, side, perspective view of a surgical platform system of the present disclosure with a patient positioned thereon.
Figure 8:
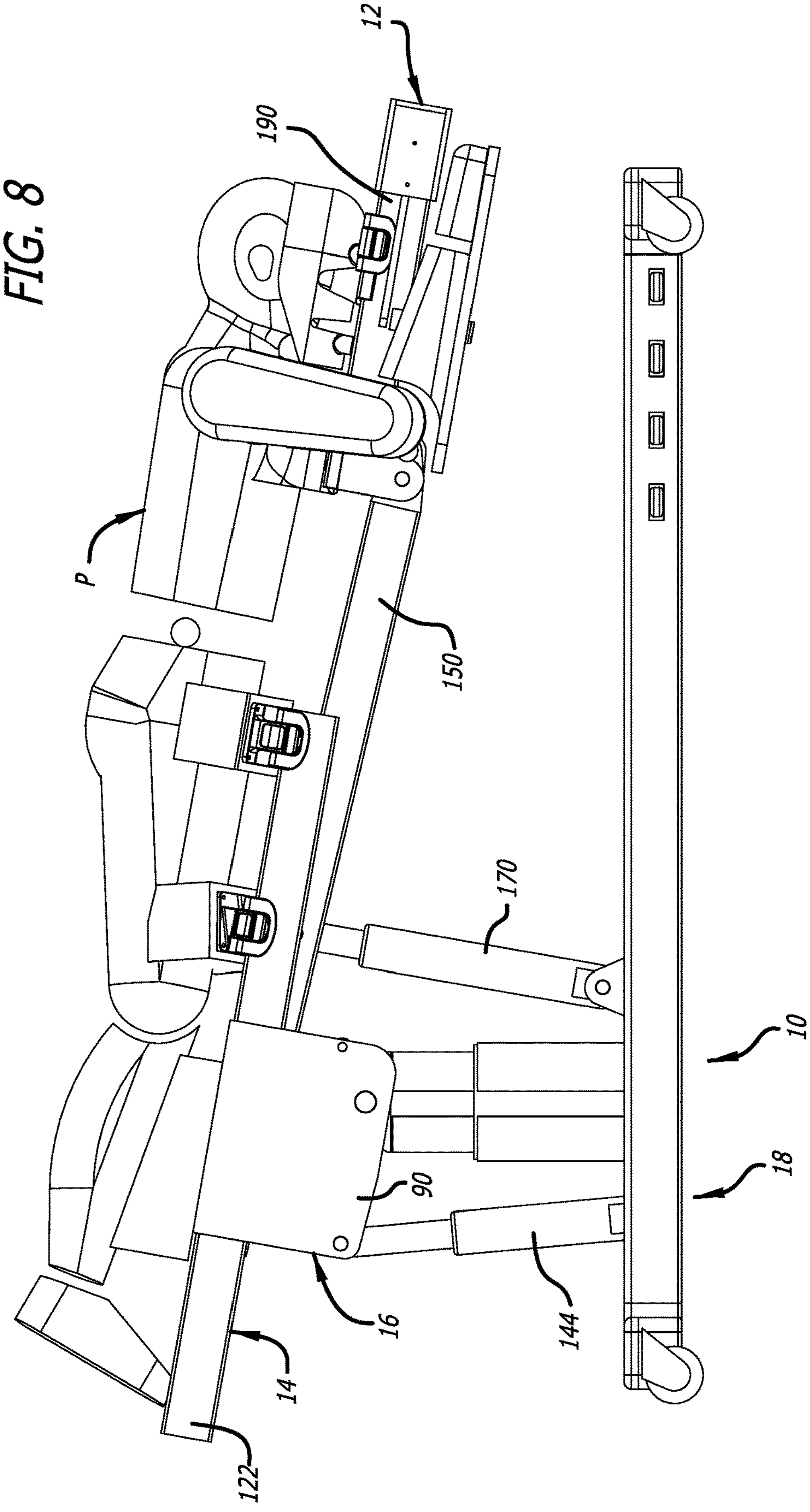
FIG. 8 is a first lateral side, elevational view of the surgical platform system of FIG. 1 including portions thereof oriented to position the patient in a Trendelenburg position.
Figure 9:
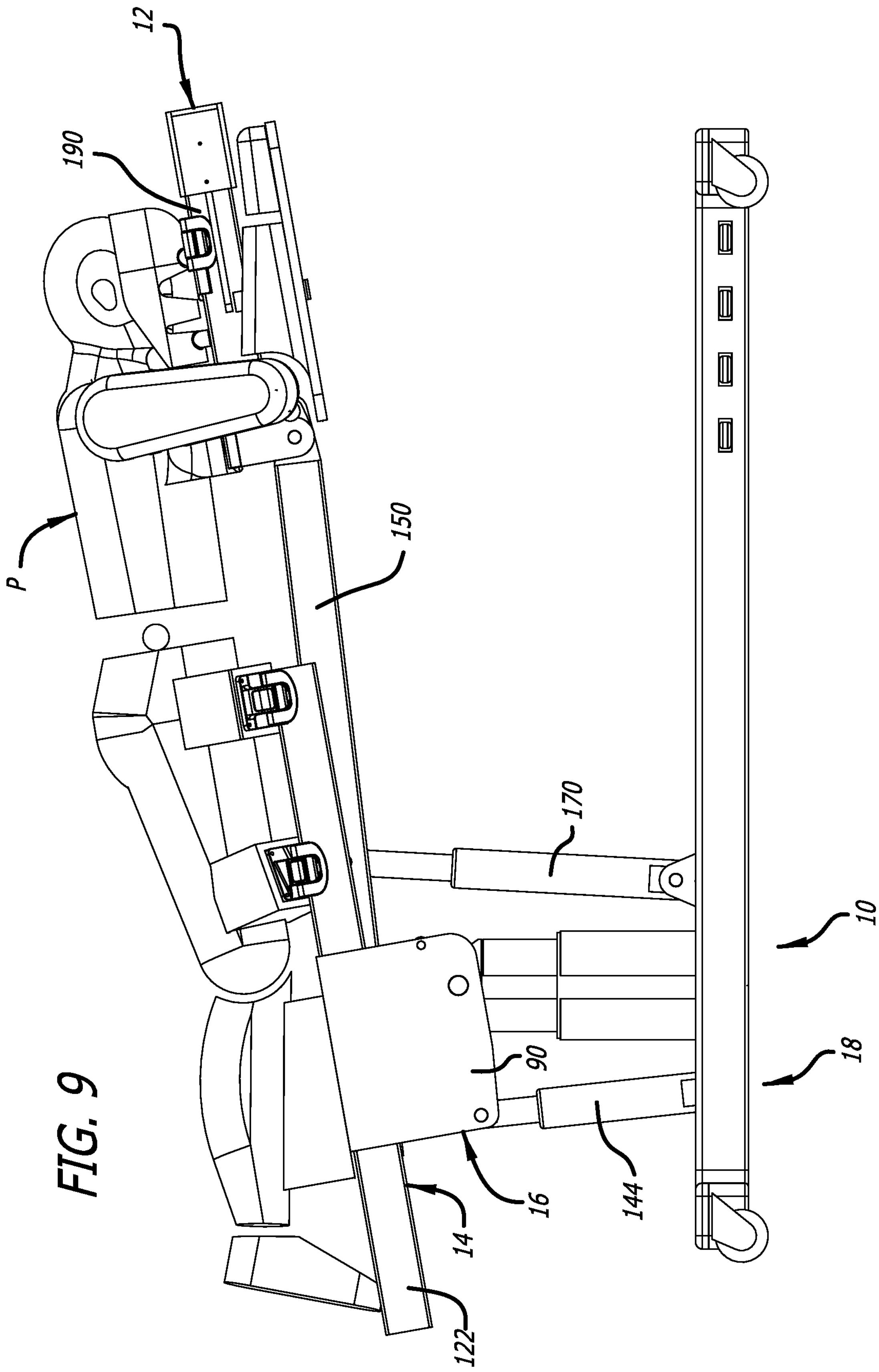
FIG. 9 is a first lateral side, elevational view of the surgical platform system of FIG. 1 including portions thereof oriented to position the patient in a Reverse-Trendelenburg position.

A preferred embodiment of a surgical platform system of the present disclosure is generally indicated by the numeral 10 in FIGS. 1-7. As depicted in FIG. 1, the surgical platform system 10 includes a first end $E_1$, a second end $E_2$, and a mid-longitudinal $L_1$ extending through the first end $E_1$ and the second end $E_2$. The surgical platform system 10 includes a first platform portion 12, a second platform portion 14, a linkage portion 16, and a support portion 18. The first platform portion 12 and the second platform portion 14 can each support portions of a patient P thereon, the linkage portion 16 is used in adjusting the position and orientation of the first platform portion 12 and the second platform portion 14 relative to one another, and the support portion 18 supports the first platform portion 12, the second platform portion 14, and the linkage portion 16 relative to the ground. The first support platform 12 can be used in supporting the head and the torso of the patient P, the second platform portion 14 can be used in supporting the legs of the patient P, and the linkage portion 16 can be used to adjust the head and torso relative to the legs of the patient P by positioning and orienting the first support platform 12 and the second support platform 14 relative to one another. For example, the surgical platform system 10 can be used to adjust the first platform portion 12 and the second platform portion 14 to position/orient the patient in the Trendelenburg position (FIG. 8) and the Reverse-Trendelenburg position (FIG. 9).

As discussed below, the surgical platform system 10 can be positioned and repositioned relative to, be interconnected with, and used in association with a surgical robotic system or robotic surgical guidance system (hereinafter referred to as "robotic system") generally indicated the letter R (FIGS. 10-16). And the robotic system R can be used for performing surgery or facilitating performance of surgery, and such surgery, for example, can included spinal surgery on the spine of the patient P.

Ultimately, the surgical platform system 10 can be operatively attached to a gantry G of the robotic system R, and a robotic arm A supported by the gantry G can be used to perform surgery or facilitate performance of surgery on the patient P. In addition to the relative adjustment of the first platform portion 12 and the second platform portion 14 by the surgical platform system 10, the gantry G, as discussed below, also can be used in adjusting portions relative to other portions of the surgical platform system 10. The relative adjustment of the first platform portion 12 and the second platform portion 14 by the surgical platform system 10 and/or the adjustment afforded by the operative attachment of the surgical platform system 10 to the gantry G can be used to manipulate the body of the patient P and position/orient and reposition/reorient the patient P with respect to the robotic arm A.

The surgical platform system 10 and/or the robotic system R can include a controller or controllers for controlling motorized actuators included in the surgical platform system 10 and/or the gantry G to facilitate the operation thereof. In some embodiments, for example, one of more controllers of the surgical platform system 10 and/or the robotic system R can coordinate movement therebetween by moving the first platform portion 12 and the second platform portion 14 relative to one another.

During use, the support portion 18 can be used to facilitate movement of the first platform portion 12, the second platform portion 14, and the linkage portion 16, and can be used positioning the first platform portion 12 relative to the robotic system R. The first platform portion 14 can then be interconnected with the robotic system R or a sub-system (not shown) positioned relative to the robotic system. The support portion 18, as depicted in FIGS. 1-4, includes a horizontally-oriented portion 20 and a vertically-oriented portion 22. The horizontally-oriented portion 20 is used in supporting the vertically-oriented portion 22 relative to the ground, and the vertically-oriented portion 22 is used in supporting the first platform portion 12, the second platform portion 14, and the linkage portion 16 relative to the horizontally-oriented portion 20. After the support portion 18 is properly positioned relative to the robotic system R, the first platform portion 12 can be interconnected with the robotic system R or the sub-system positioned relative to the robotic system.

As depicted in FIG. 1, the horizontally-oriented portion 20 includes a first end member 24 at a first end 25 thereof (collocated with the first end $E_1$), a second end member 26 at a second end 27 thereof (collocated with the second end $E_2$), and a cross member 30 extending between the first end member 24 and the second end member 26. The cross member 30 can be aligned with a mid-longitudinal axis $L_2$ (FIG. 1) of the horizontally-oriented portion 20, can be used to connect the first end member 24 and the second end member 26, and can be expandable and contractable to expand and contract a length of the horizontally-oriented portion 20 along the mid-longitudinal axis $L_2$. Each of the first end member 24 and the second end member 26 includes an upper surface 32, a lower surface 34, a first lateral end 36, and a second lateral end 38. Furthermore, casters 40 can be attached relative to the lower surfaces 34 adjacent the first lateral ends 36 and the second lateral ends 38 of the of the first end member 24 and the second end member 26 to space the first end member 24 and the second end member 26 from the ground and to facilitate movement of the support portion 14.

The surgical platform system 10 initially can be positioned relative to the robotic system R using a positioner 42 having portions provided as part of the surgical platform system 10 and the robotic system R. To illustrate, the positioner 42 can include a receiver portion 44 (FIG. 5) that can be provided as part of the support portion 18, and a tongue portion 46 (FIG. 10) that can be attached to or positioned relative to the robotic system R, or vice versa. A similar positioner that can be used as part of the surgical platform system 10 and the robotic system R is disclosed in U.S. Ser. No. 17/740,559, filed May 10, 2022, which is hereby incorporated by reference herein.

The receiver portion 44 can be provided at and adjacent the first end 25, can be formed by and/or attached relative to portions of the first end member 24 and the cross member 30. The receiver portion 44 can be formed as a tunnel formed in portions of the first end member 24 and the cross member 30. The receiver portion 44 includes a first sidewall portion 50 with portions provided adjacent a first lateral side 52 of the cross member 30, a second sidewall portion 54 with portions provided adjacent a second lateral side 56 of the cross member 30, and an upper wall portion 58 formed in part by the lower surface 34 of the first end member 24 and portions of the cross member 30.

Portions of the first sidewall portion 50, the second sidewall portion 54, and the upper wall portion 58 form the tunnel to define a receiving area $A_1$ for receiving the tongue portion 46. Furthermore, each of the first sidewall portion 50 and the second sidewall portion 54 can include various apertures 60 adjacent the receiving area $A_1$ that are spaced therealong, and include various bumper wheels 62 rotatably mounted in the various apertures 60. Portions of the bumper wheels 62 can extend into the receiving area $A_1$. When the tongue portion 46 is received in the receiving area $A_1$, the bumper wheels 62 are used to both guide and position the tongue 46 relative the first sidewall portion 50 and the second sidewall portion 54 (and the remainder of the horizontally-oriented portion 20).

The tongue portion 46 can be attached to (FIG. 10) or otherwise positioned relative to the robotic system R, and includes a first end 64 and an opposite second end 66. The tongue portion 46 can be attached to the robotic system R at and adjacent the first end 64. Furthermore, the tongue portion 46 can include a first lateral side surface 70, a second lateral side surface 72, and a bottom surface 74 extending between the first end 64 and the second end 66. Adjustable feet 76 can be attached to the bottom surface 74 adjacent the second end 66 to facilitate leveling of at least portions of the tongue portion 46.

Figure 10:
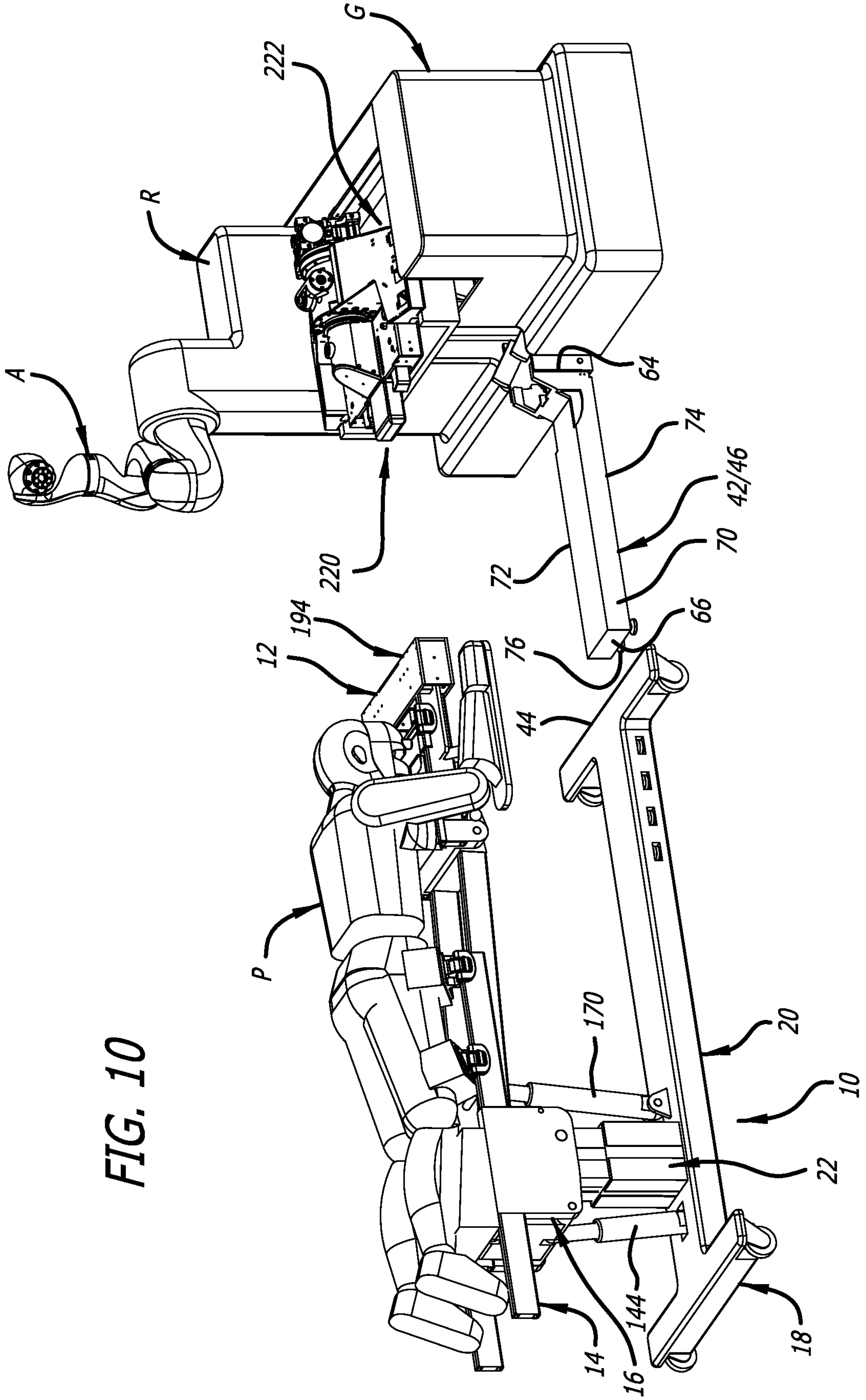
FIG. 10 is a side, top, perspective view of the surgical platform system of FIG. 1 being positioned relative to a gantry of a surgical robotic system or robotic surgical guidance system.
Figure 11:
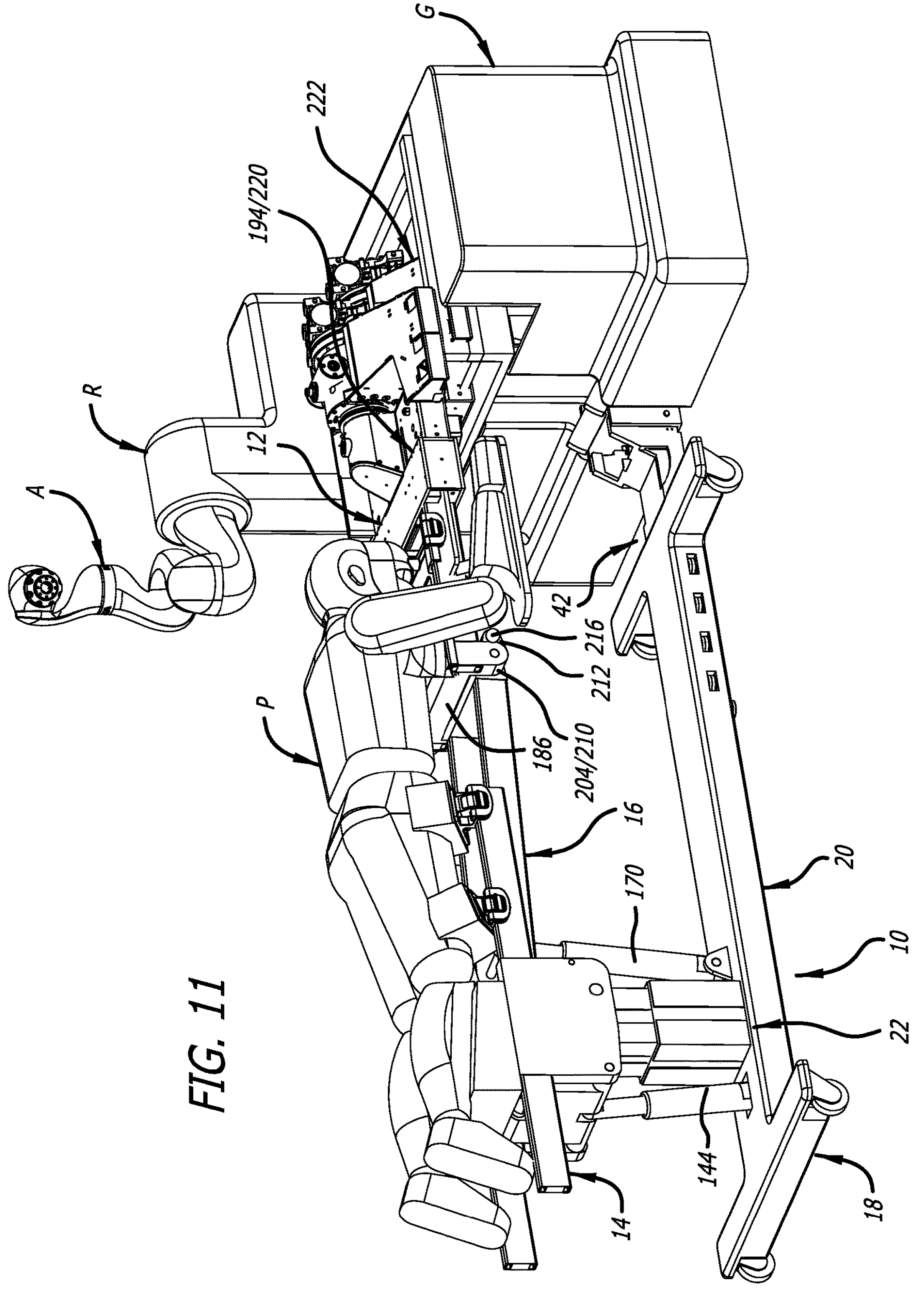
FIG. 11 is a side, top, perspective view of the surgical platform system of FIG. 1 interconnected relative to the gantry of FIG. 10.
Figure 12:
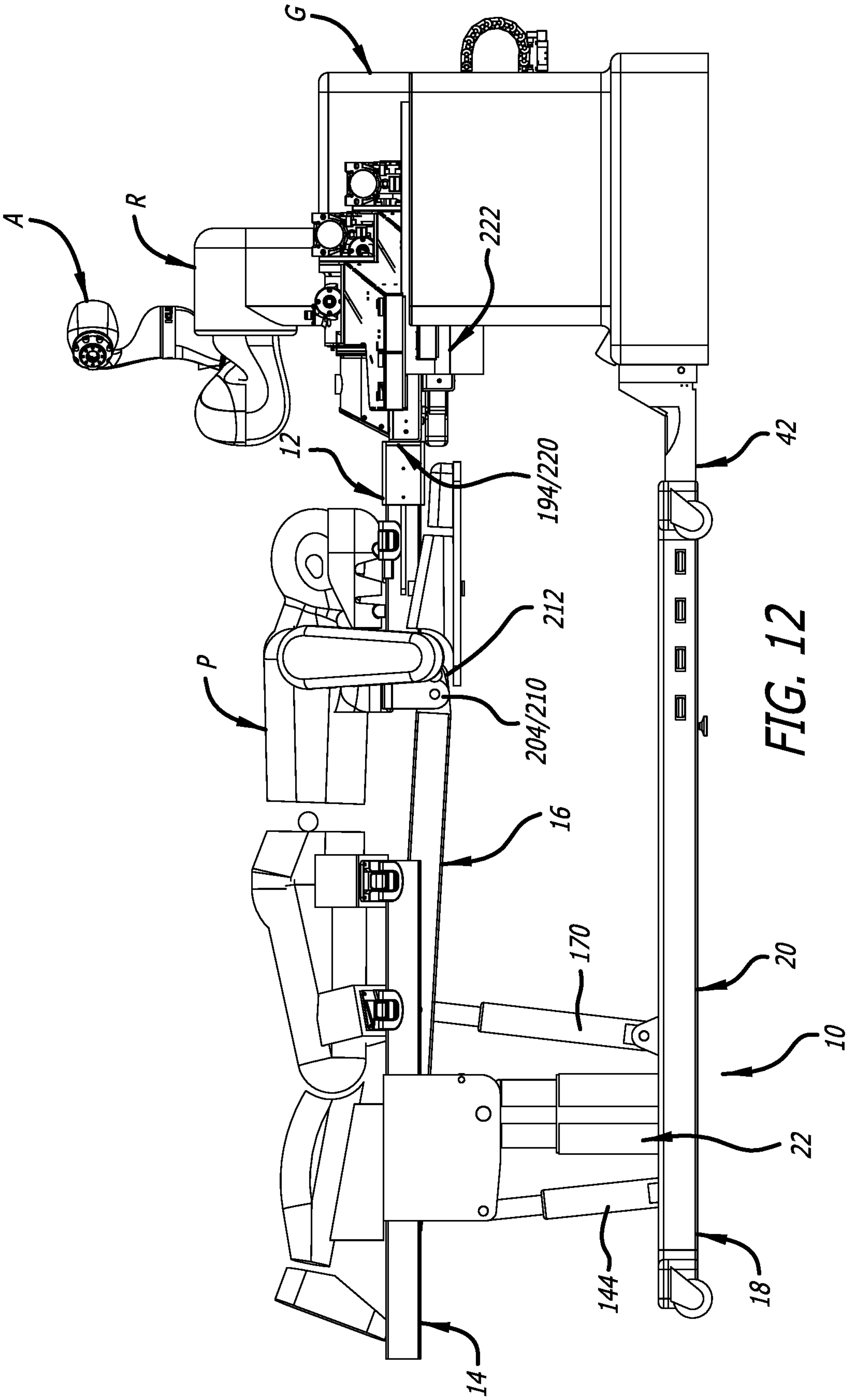
FIG. 12 is a first lateral side, elevational view of the surgical platform system of FIG. 1 interconnected relative to the gantry of FIG. 10.
Figure 13:
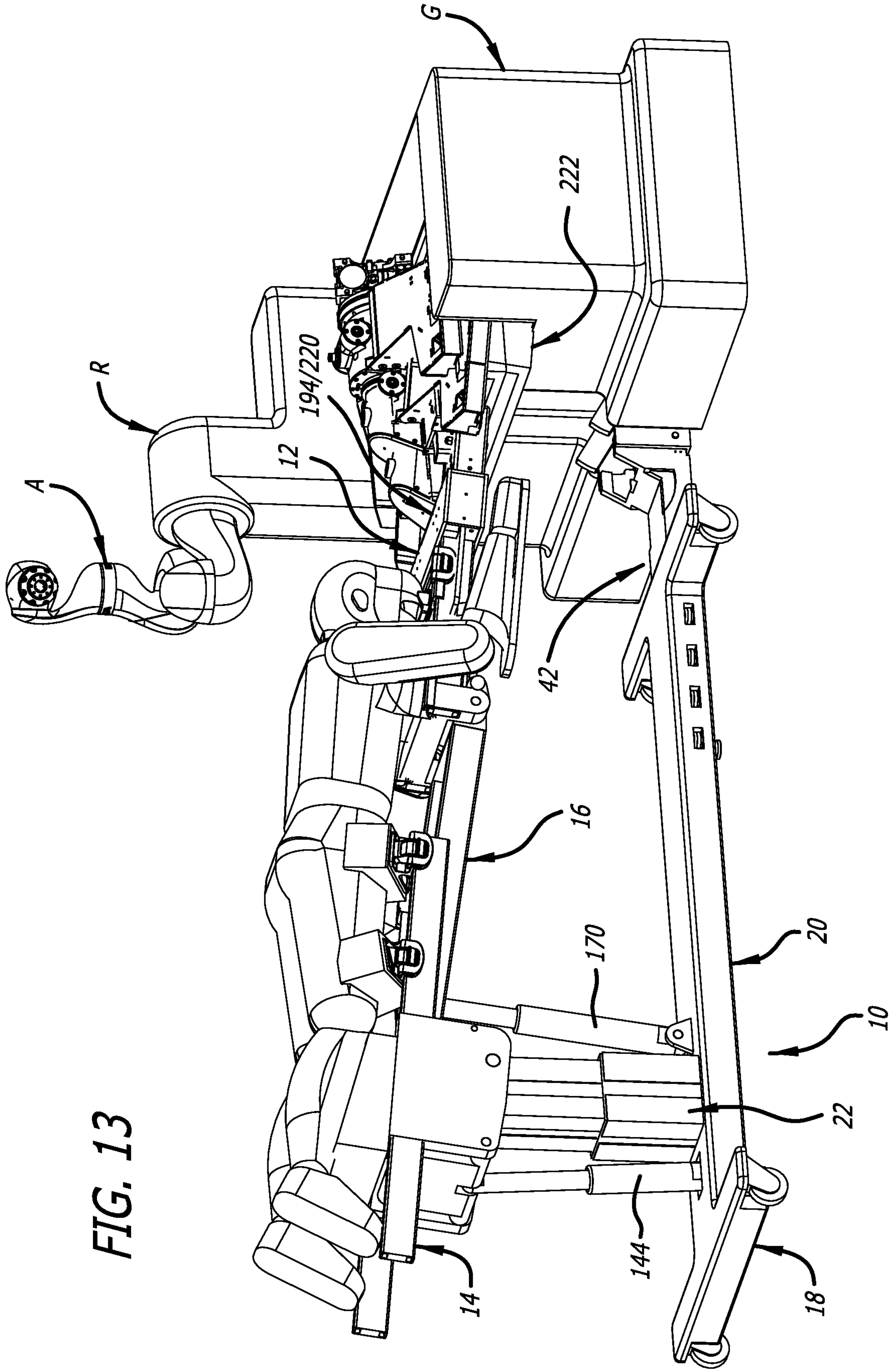
FIG. 13 is a side, top, perspective view of the surgical platform system of FIG. 1 interconnected relative to the gantry of FIG. 10 with portions of the surgical platform system and the gantry oriented to position the patient in a Trendelenburg position.

As depicted in FIG. 10, to initially position the support portion 18 relative to the robotic system R, the horizontally-oriented portion 20 of the support portion 14 can be positioned so that the tongue portion 46 is received in the receiver portion 44. In doing so, the tongue portion 46 is inserted between the first sidewall portion 50 and the second sidewall portion 54, under the upper wall portion 58, and into the receiving area $A_1$. As the tongue portion 46 is received in the receiving area $A_1$, the first lateral side surface 70 contacts the bumper wheels 62 rotatably mounted to the first sidewall portion 50, and the second lateral side surface 72 contacts the bumper wheels 62 rotatably mounted to the second sidewall portion 54. Such contact affords relative movement of the tongue portion 46 to the receiver portion 44 that guides the tongue portion 46 into the receiving area $A_1$ to initially position the surgical platform system 10 relative to the robotic system R.

When the surgical platform system 10 is attached relative to the robotic system R, adjustment of the first platform portion 12 and the second platform portion 14 relative to one another (via operation of the surgical platform system 10 and/or the robotic system R) can change the distance between the second platform portion 14 and the gantry G, and the position of the tongue portion 46 in the receiving area A1 can correspondingly change during such operation. As such, the tongue portion 46 can be moved into and out of the receiving A1 according to the changes in the distance between the second platform portion 14 and the gantry G.

Figure 2:
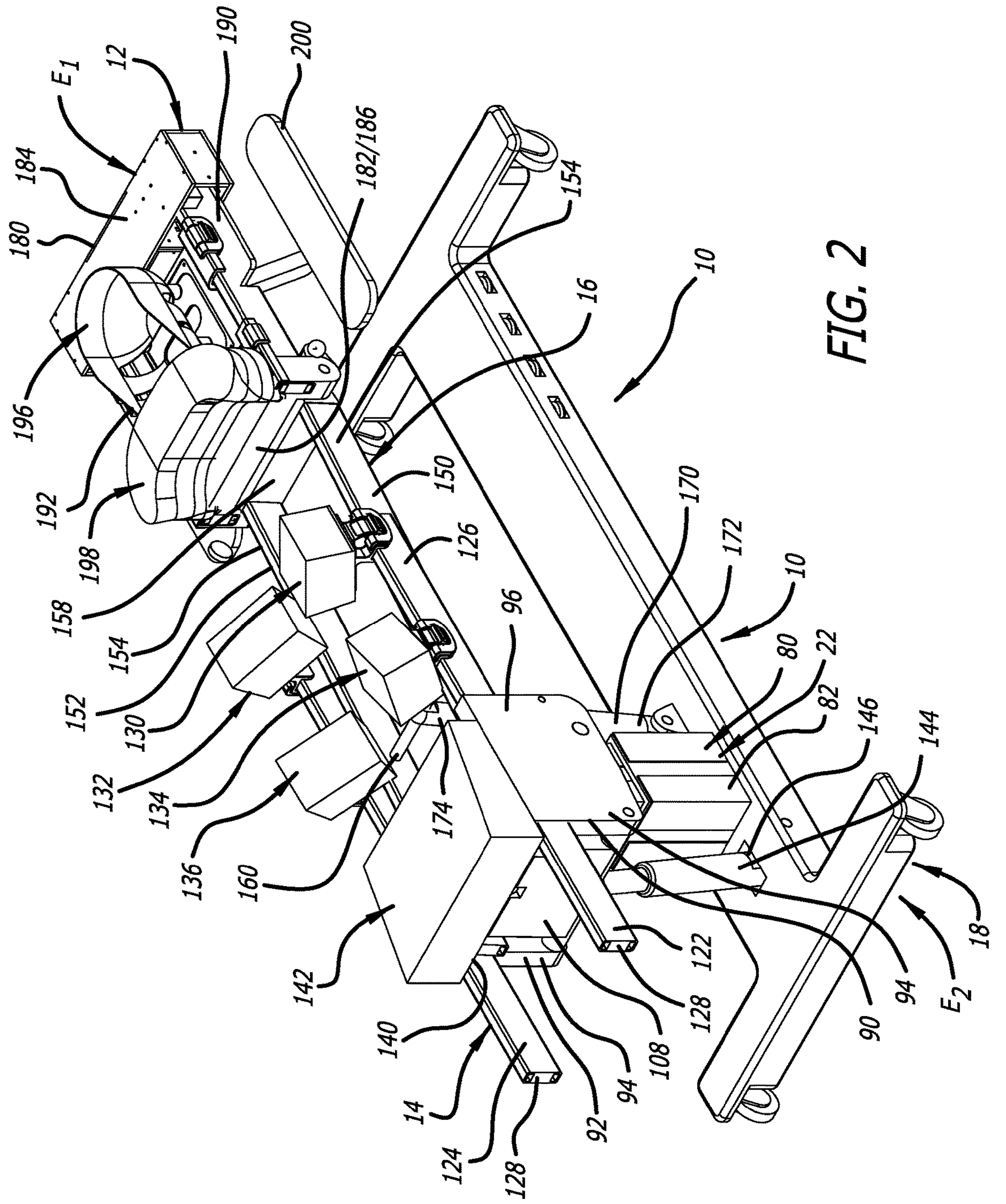
FIG. 2 is a top, side, perspective view of the surgical platform system of FIG. 1.
Figure 3:
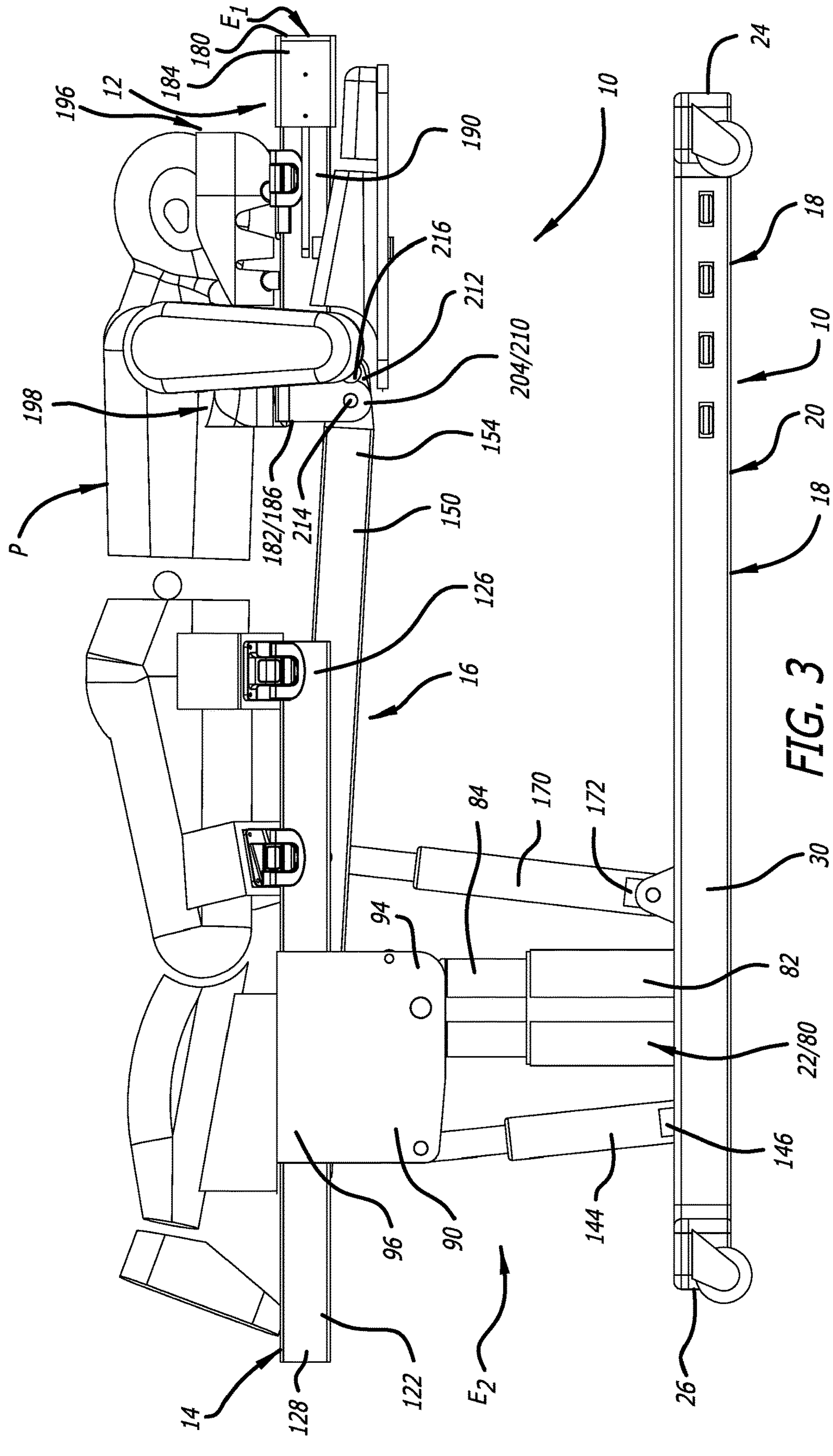
FIG. 3 is a first lateral side, elevational view of the surgical platform system of FIG. 1 with the patient positioned thereon.
Figure 4:
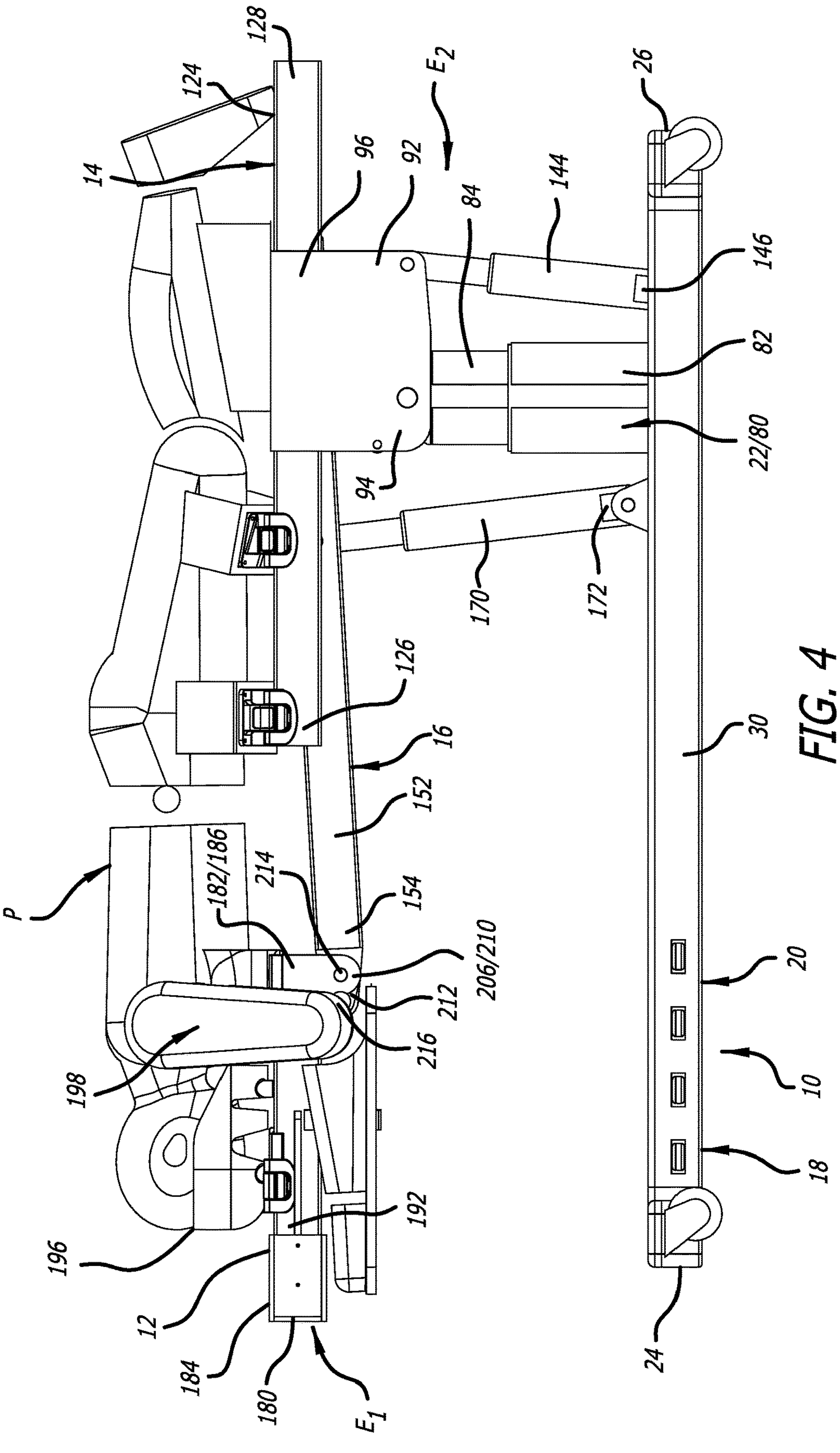
FIG. 4 is a second lateral side, elevational view of the surgical platform system of FIG. 1 with the patient positioned thereon.

As depicted in FIG. 2-4, the vertically-oriented portion 22 includes a telescoping column 80 for positioning/orienting and repositioning/reorienting the first platform portion 12, the second platform portion 14 and the linkage portion 16 relative to the horizontally-oriented portion 20. The telescoping column 80 includes a lower portion 82 and an upper portion 84. The lower portion of the telescoping column 80 is supported by the cross member 30, and the upper portion 84 can be telescopically moved upwardly and downwardly relative to the lower portion 82. The telescopic expansion and contraction of the telescoping column 80 can be used to correspondingly raise and lower the first platform portion 12, the second platform portion 14, and the linkage portion 16 relative to the horizontally-oriented portion 20 to position/orient and reposition/reorient the first platform portion 12, the second platform portion 14, and the linkage portion 16 between a lower position and an upper position.

Figure 5:
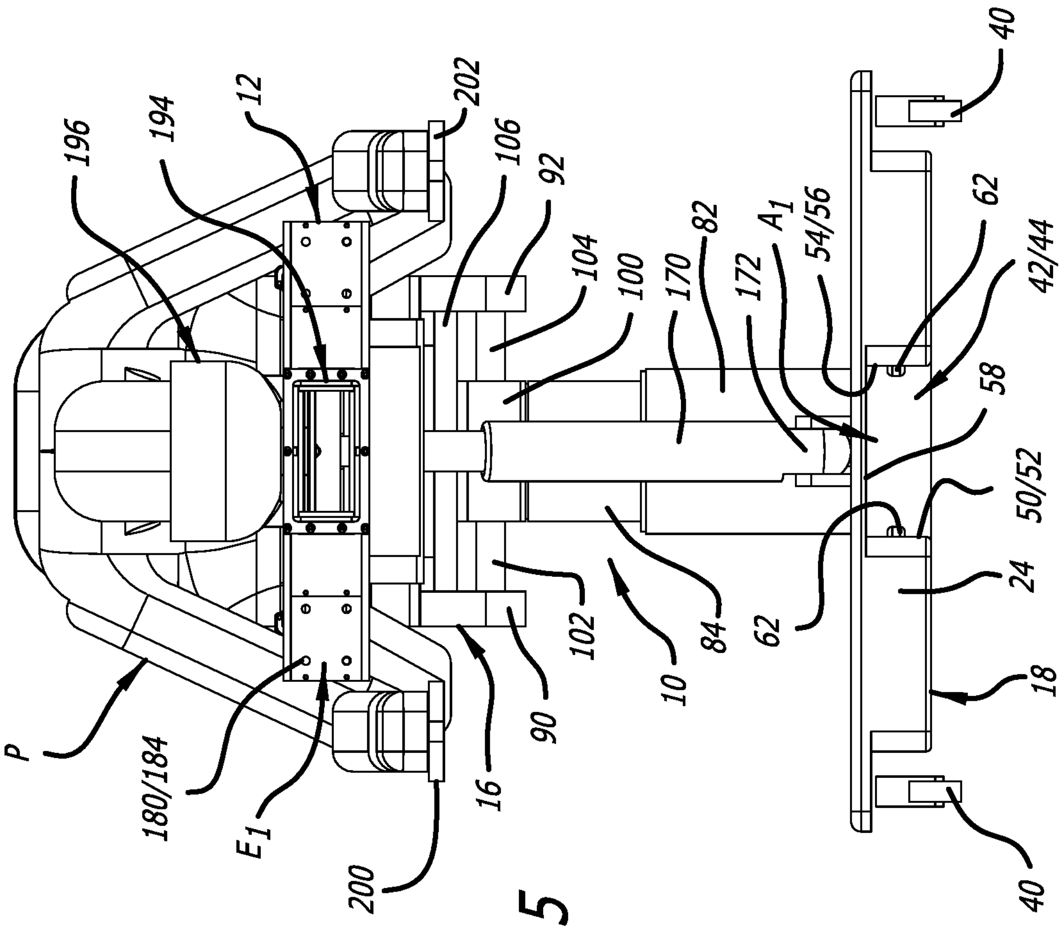
FIG. 5 is a front, elevational view of the surgical platform system of FIG. 1 with the patient positioned thereon.

The linkage portion 16, as depicted in FIGS. 2-4 and 6, includes a base formed by a first base portion 90 positioned adjacent a first side of the telescoping column 80 and a second base portion 92 positioned adjacent a second side of the telescoping column 80. As discussed below, the first base portion 90 and the second base portion 92 are pivotally attached to a portion of the upper portion 84, and the base formed by the first base portion 90 and the second base portion 92 affords pivotal movement of other portions of the linkage portion 16 relative thereto. The first base portion 90 and the second base portion 92 can each include a lower portion 94 and an upper portion 96. Furthermore, as depicted in FIG. 5, the upper portion 84 of the telescoping column 80 can include an extended portion 100 with a first post 102 on a first side of the extended portion 100, and a second post 104 on a second side of the extended portion 100. The lower portion 94 of the first base portion 90 can be pivotally attached to the first post 102, and the lower portion 94 of the second base portion 92 can be pivotally attached to the second post 104. The lower portions 94 of the first base portion 90 and the second base portion 92 are pivotally attached to the first post 102 and the second post 104, respectively, adjacent ends of the lower portions 94 closest to the first end $E_1$. As discussed below, pivotal movement of the first base portion 90 and the second base portion 92 affords articulation of the first platform portion 12 and the second platform portion 14 relative to the telescoping column 80.

Figure 6:
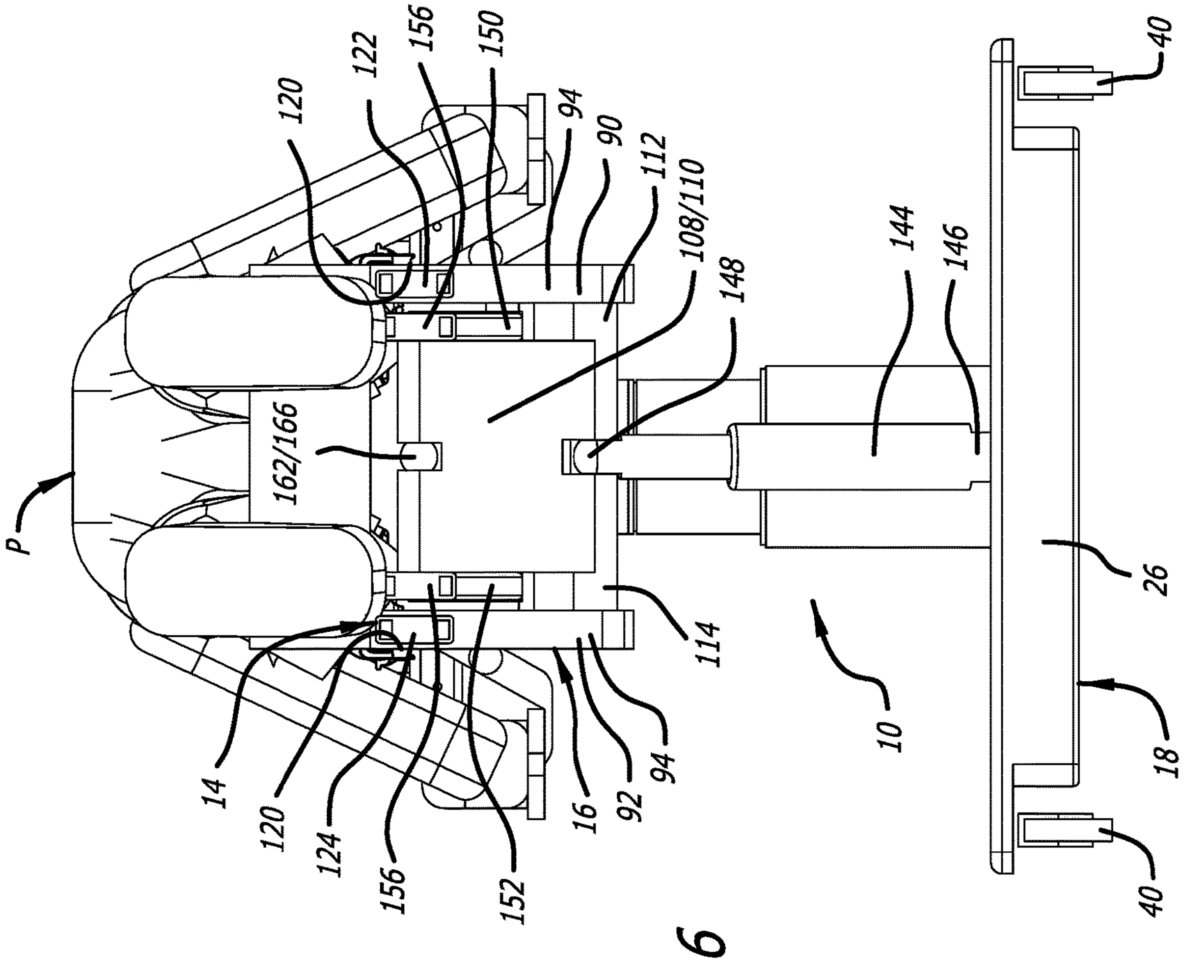
FIG. 6 is a rear, elevational view of the surgical platform system of FIG. 1 with the patient positioned thereon.
Figure 7:
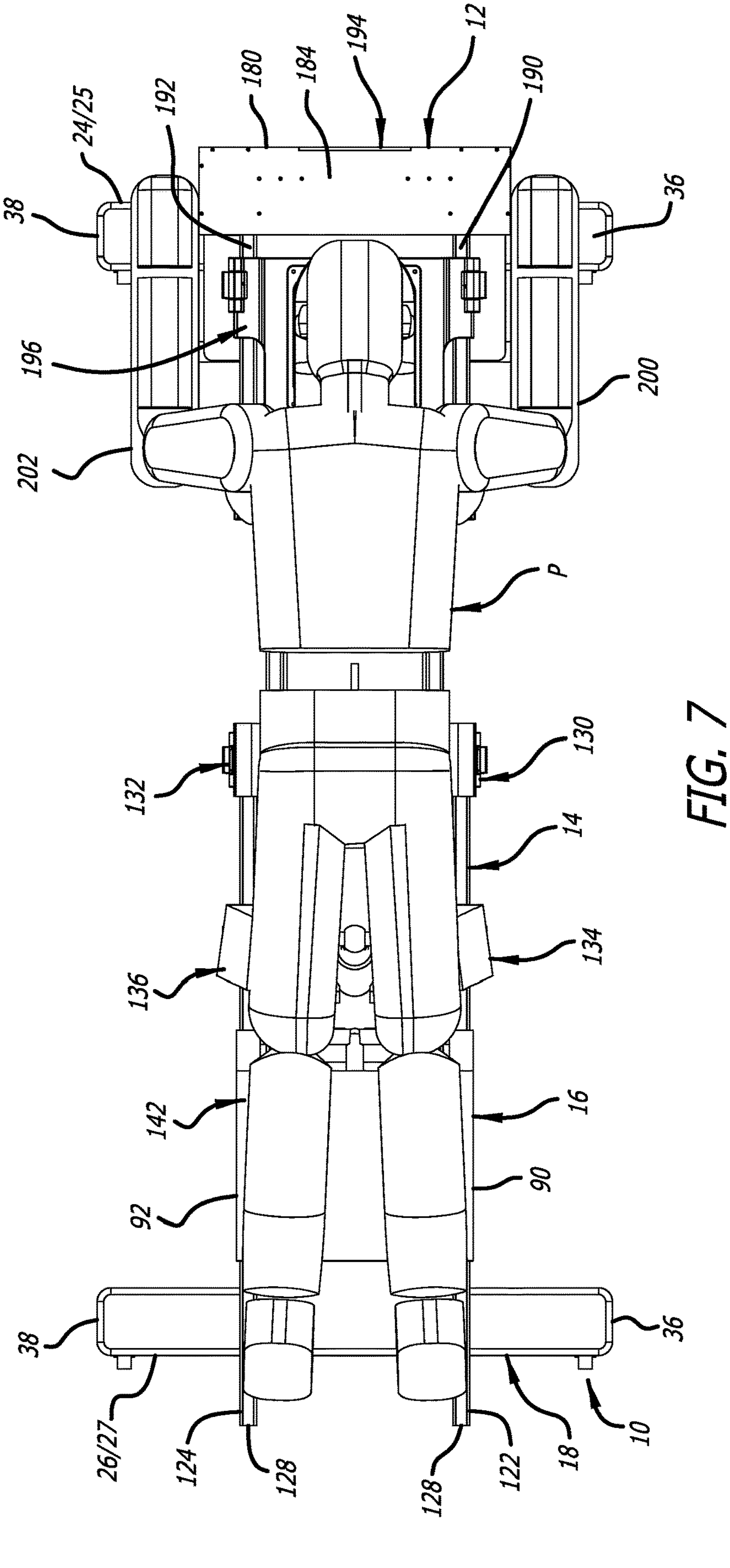
FIG. 7 is a top, plan view of the surgical platform system of FIG. 1 with the patient positioned thereon.

In addition to being attached relative to one another by being pivotally attached to the first post 102 and the second post 104, the first base portion 90 and the second base portion 92 can be attached to one another via a first connector 106 and a second connector 108. The first connector 106 and the second connector 108 extend between and are fastened to the first base portion 90 and the second base portion 92. As depicted in FIGS. 5 and 6, the first connector 106 is attached to the lower portions 94 of the first base portion 90 and the second base portion 92 above where the first base portion 90 and the second base portion 92 are pivotally attached to the first post 102 and the second post 104, respectively; and the second connector 108 is attached to the lower portions 94 of the first base portion 90 and the second base portion 92 adjacent ends of the lower portions 94 closest to the second end $E_2$.

The attachment to the first post 102 and the second post 104, and, as discussed below, the first connector 106 and the second connector 108 serve in spacing the first base portion 90 and the second base portion 92 apart from one another and providing a rigid and stable connection therebetween. For example, as depicted in FIG. 5, the first connector 106 can be formed as a single rod portion extending between and attaching the first base portion 90 and the second base portion 92 to one another. And, as depicted in FIG. 6, the second connector 108 can include a web portion 110, a first rod portion 112 on a first side of the web portion 110, and a second rod portion 114 on a second side of the web portion 110. Portions of a lower portion of the web portion 110, the first rod portion 112, and the second rod portion 114 extend between and attach the first base portion 90 and the second base portion 92 to one another. The first connector 106 can be fixedly attached between the first base portion 90 and the second base portion 92, and the portions the web portion 110, the first rod portion 112, and the second rod portion 114 of the second connector 108 can be pivotally connected to the first base portion 90 and the second base portion 92.

As depicted in FIG. 6, the upper portions of the first base portion 90 and the second base portion 92 can each include a recess 120 for receiving portions of the second platform portion 14 to facilitate attachment of the second platform portion 14 thereto. The second support platform 14, as depicted in FIG. 2, includes a first support portion 122 and a second support portion 124, and the first support portion 122 and the second support portion 124 each include a first end 126 and a second end 128. The first support portion 122 and the second support portion can each be formed, for example, as beams, rails, rods, or tubes having lengths extending between the first end 126 and the second end 128. Portions of the first support portion 122 between the first end 126 and the second end 128 are attached to the first base portion 90 via receipt and attachment thereof in the recess 120, and portions of the second support portion 124 between the first end 126 and the second end 128 are attached to the second base portion 92 via receipt and attachment thereof in the recess 120.

A first upper thigh support 130, a second upper thigh support 132, a first lower thigh support 134, a second lower thigh support 136, a support plate 140, and a lower leg support 142 are supported by and/or between the first support portion 122 and/or the second support portion 124. As depicted in FIG. 2, the first upper thigh support 130 and the first lower thigh support 134 are supported by the first support portion 122. The second upper thigh support 132 and the second lower thigh support 136 are supported by the second support portion 124. The support plate 140 (supporting the lower leg support 142) is supported between the first support portion 122 and the second support portion 124. The first upper thigh support 130, the second upper thigh support 132, the first lower thigh support 134, the second lower thigh support 136, and the support plate 140 can be configured similarly to those disclosed in U.S. Ser. No. 17/704,759, filed Mar. 25, 2022, which is hereby incorporated by reference herein, and the positions thereof can be adjusted relative to the first support portion 122 and the second support portion 124 to accommodate patients of different sizes.

Figure 17:
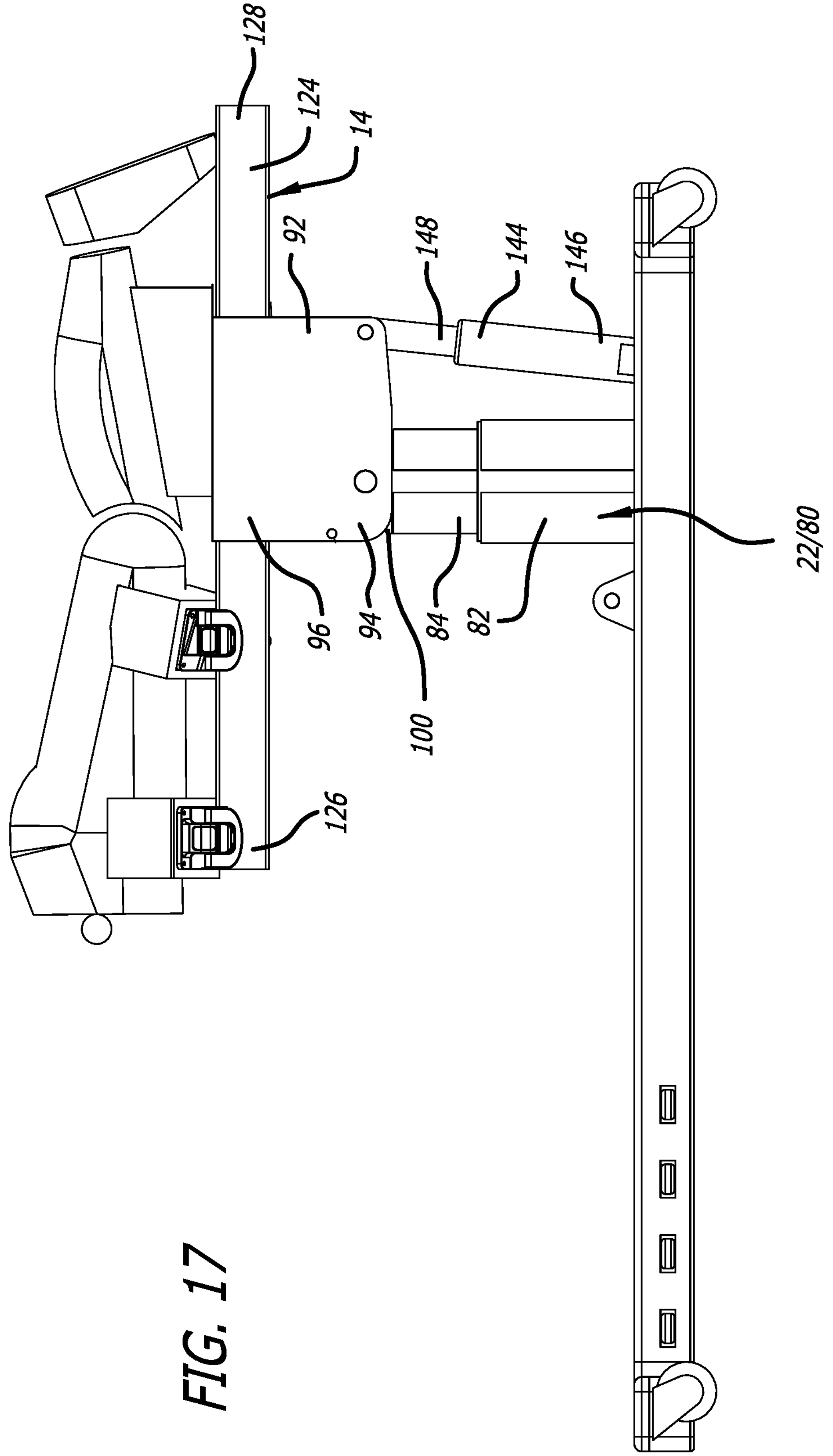
FIG. 17 is a second lateral side, elevational, fragmentary view of a portion of the surgical platform system of FIG. 1 depicting a platform portion thereof in a first position.
Figure 18:
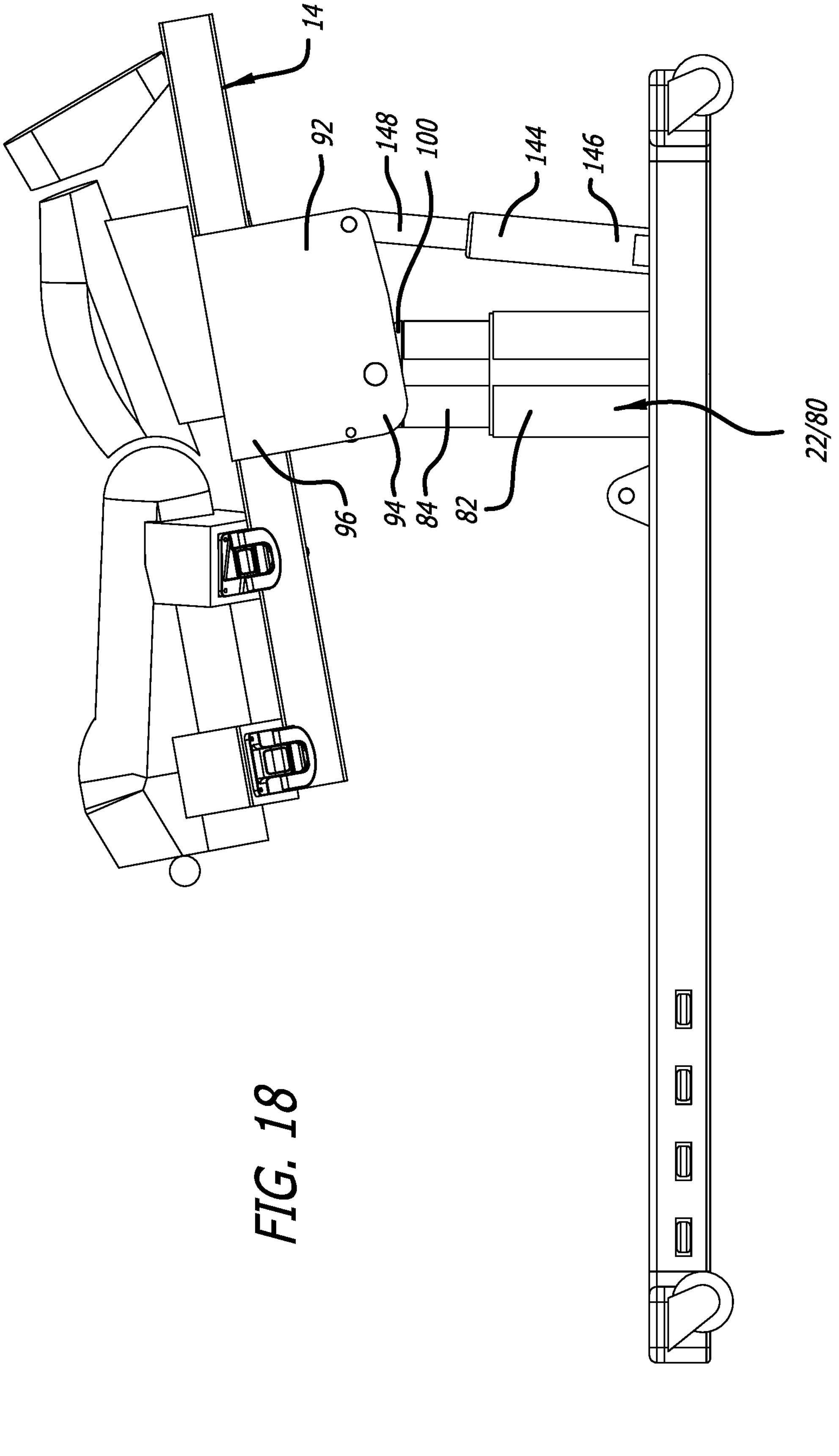
FIG. 18 is a second lateral side, elevational, fragmentary view of the portion of the surgical platform system of FIG. 1 depicting the platform portion thereof in a second position.

The second platform portion 14 can be pivoted relative to the telescoping column 80 (and the support portion 18) using a first actuator 144 that is actuatable (via expansion and contraction thereof) between at least a first position (FIG. 17) and a second position (FIG. 18). The first actuator 144 has a first end 146 pivotally attached to the horizontally-oriented portion 20, and a second end 148 pivotally attached to the second connector 108 (between the first rod portion 112 and the second rod portion 114, and portions of the web portion 110). The first end 146, for example, can be pivotally attached to the horizontally-oriented portion 20 in an aperture formed therein or a clevis extending outwardly therefrom. Actuation of the first actuator 144 moves the second connector 108 toward or away from the horizontally-oriented portion 20, and correspondingly pivots the first base portion 90, the second base portion 92, and the second platform portion 14 attached thereto relative to the telescoping column 80 (and the support portion 18). In doing so, the first ends 126 of the first support portion 122 and the second support portion 124 are tipped downwardly via expansion of the first actuator 144 or tipped upwardly via contraction of the first actuator 144 to correspondingly tilt the second platform portion 14.

The linkage portion 16 includes a third support portion 150 and a fourth support portion 152 supporting the first platform portion 12, and the third support portion 150 and the fourth support portion 152 are pivotally attached to the second connector 108. The third support portion 150 and the fourth support portion 152 can each be formed, for example, as beams, rails, rods, or tubes having lengths extending between opposite ends thereof. The first platform portion 12 can be oriented relative to the column 80 (and the support portion 18) via pivotal movement of the first base portion 90 and the second base portion 92, via pivotal movement of the second connector 108 relative to the first base portion 90 and the second base portion 92, and via pivotal movement of the third support portion 150 and the fourth support portion 152 relative to the second connector 108. Pivotal movement of the second connector 108 relative to the first base portion 90 and the second base portion 92, and pivotal movement of the third support portion 150 and the fourth support portion 152 relative to the second connector 108 also orients the first platform portion 12 relative to the second platform portion 14.

As depicted in FIG. 2, the third support portion 150 and the fourth support portion 152 each include a first end 154 and a second end 156. The first platform portion 12 is supported by the third support portion 150 and the fourth support portion 152 adjacent the first ends 154 thereof. And the second ends 156 of the third support portion 50 and the fourth support portion 152 are spaced apart by and pivotally attached to an upper portion of the web portion 110 of the second connector 108. The third support portion 150 and the fourth support portion 152 also are spaced apart by an end portion 158 of the linkage portion 16 at the first ends 154 thereof, and by a third connector 160 intermediate the first ends 154 and the second ends 156.

Figure 19:
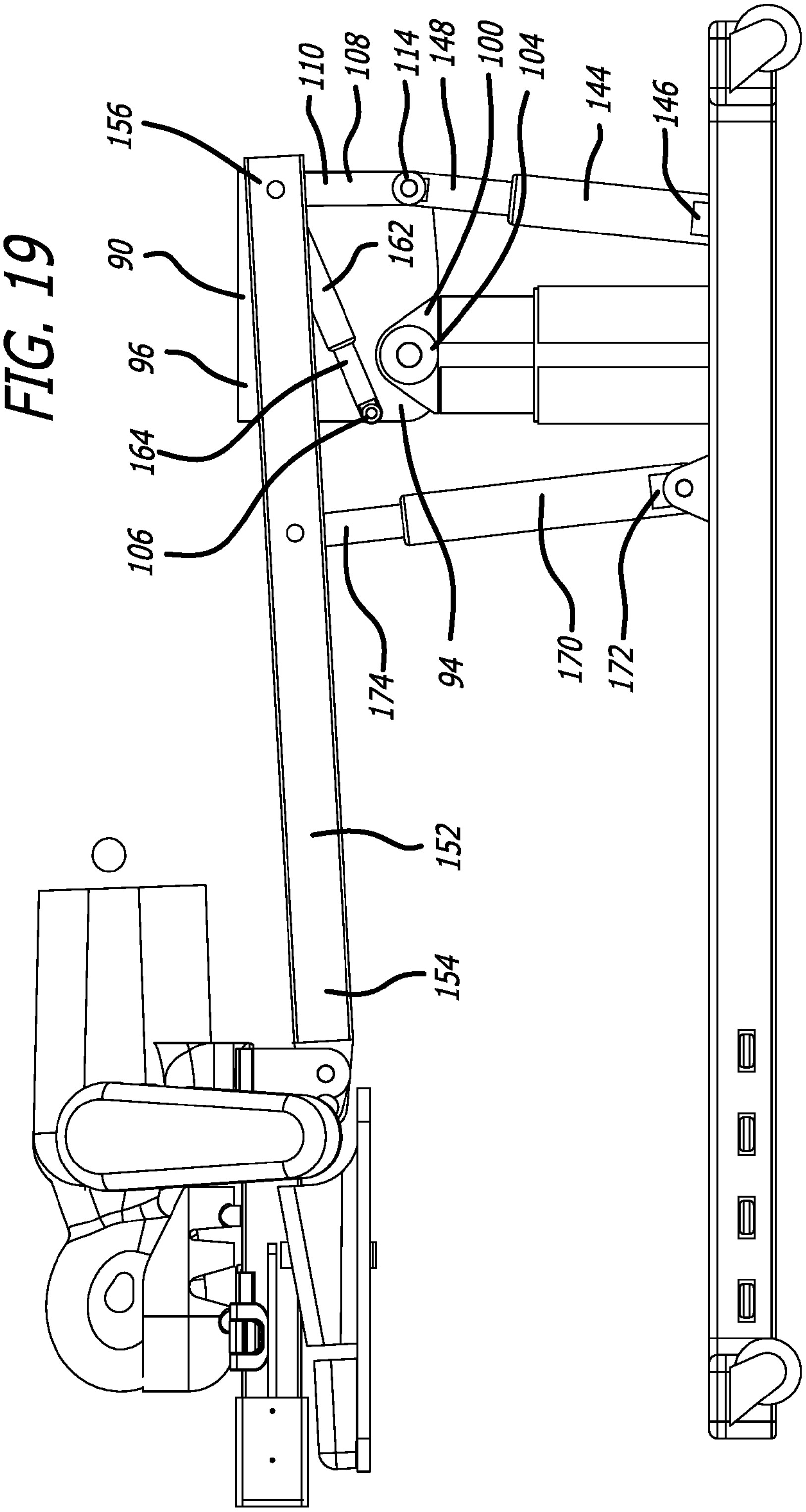
FIG. 19 is a second lateral side, elevational, fragmentary view of a portion of the surgical platform system of FIG. 1 depicting portions of another platform portion thereof in a first position.
Figure 20:
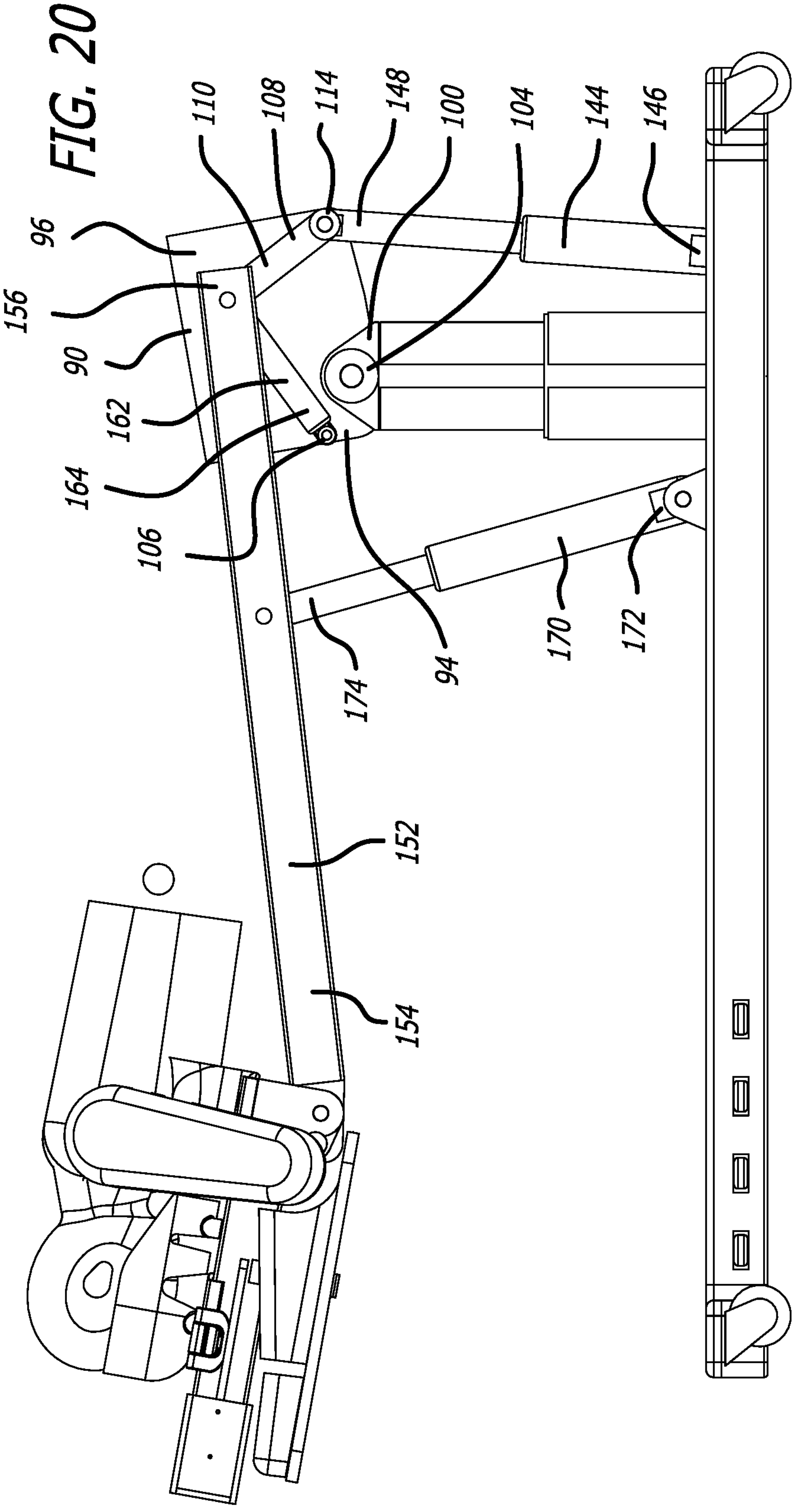
FIG. 20 is a second lateral side, elevational, fragmentary view of a portion of the surgical platform system of FIG. 1 depicting portions of the another platform portion thereof in a second position.
Figure 21:
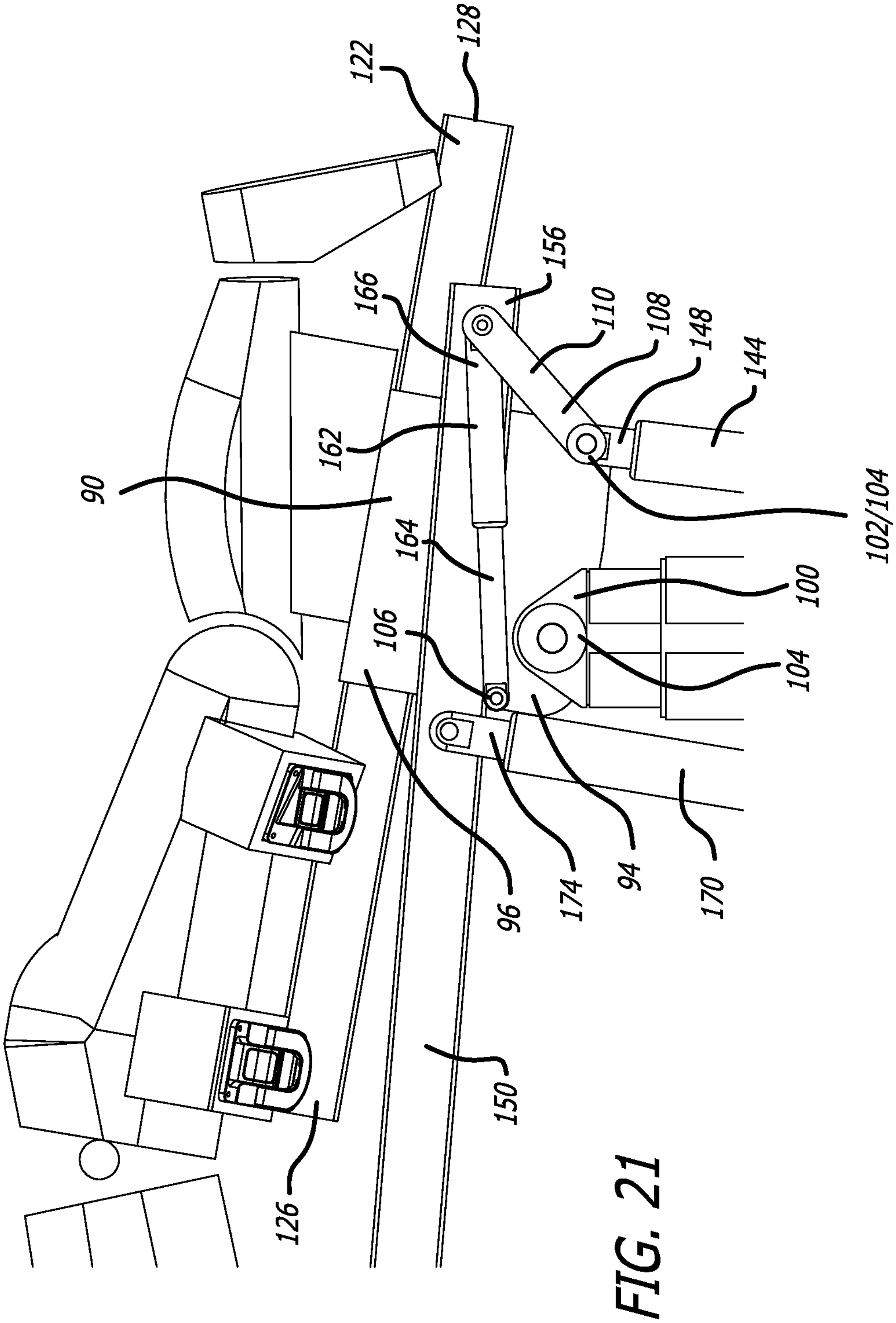
FIG. 21 is a second lateral side, elevational, fragmentary view of a portion of the surgical platform system of FIG. 1 depicting portions of the platform portion and the patient positioned thereon.

As depicted in FIGS. 19-21, pivotal movement of the second connector 108 relative to first base portion 90 and the second base portion 92 is afforded by use of a second actuator 162. The second actuator 162, as depicted in FIG. 21, has a first end 164 pivotally attached to the first connector 106, and a second end 166 pivotally attached to the upper portion of the web portion 110 of the second connector 108. The second actuator 162 is actuatable (via expansion and contraction thereof) between at least a first position (FIG. 19) and a second position (FIG. 20). Given the pivotal connection of the lower portion of the second connector 108 to the first base portion 90 and the second base portion 92, actuation of the second actuator 162 pivots the second connector 108 relative to the first base portion 90 and the second base portion 92 to correspondingly move the first ends 154 of the third support portion 150 and the fourth support portion 152 toward (via contraction) or away (via expansion) from the first end $E_1$. Thus, such pivotal movement serves in orienting the first platform portion 12 relative to the telescoping column 80 (and the support portion 18) and to the second support portion 14 by moving the first platform portion toward or away from the first end $E_1$.

As also depicted in FIGS. 19-21, pivotal movement of the third support portion 150 and the fourth support portion 152 relative to the second connector 108 is afforded by use of a third actuator 170. The third actuator 170 has a first end 172 pivotally attached to the horizontally-oriented portion 20, and a second end 174 pivotally attached to the third connector 160. The first end 172, for example, can be pivotally attached to the horizontally-oriented portion 20 in an aperture formed therein or a clevis extending outwardly therefrom. The third actuator 170 is actuatable (via expansion and contraction thereof) between at least a first position (FIG. 19) and a second position (FIG. 20). Given the pivotal connection of the third support portion 150 and the fourth support portion 152 to the upper portion of the second connector 108, actuation of the third actuator 170 pivots the third support portion 150 and the fourth support portion 152 relative to the second connector 108 to correspondingly tip the first ends 154 of the third support portion 150 and the fourth support portion 152 downwardly (via contraction) or upwardly (via expansion). Thus, such pivotal movement serves in orienting the first platform portion 12 relative to the telescoping column 80 (and the support portion 18) and to the second support portion 14 by moving the first platform portion 12 downwardly or upwardly.

The pivotal movement of the second connector 108 relative to the first base portion 90 and the second base portion 92, and the pivotal movement of the third support portion 150 and the fourth support portion 152 relative to the second connector 108 orients the first platform portion 12 relative to the second platform portion 14. As such, the first platform portion 12 and the second platform portion 14 are separately articulatable via operation of the second actuator 162 and the third actuator 170, and, when the patient P is supported on the first platform portion 12 and the second platform portion 14, such separate articulation affords subjecting the patient's body to flexion and extension.

As discussed below, actuation of the first actuator 144, the second actuator 162, and the third actuator 170 can be automated and controlled by the controller or controllers of the surgical platform system 10 and/or the robotic system R. To illustrate, the controller or controllers can be used, for example, to orient the first platform portion 12 and the second platform portion 14 relative to one another in the above-described Trendelenburg position (FIG. 8), Reverse-Trendelenburg position (FIG. 9), or other below-described orientations. As discussed below, the controller or controllers also can be used in conjunction with the robotic system R to adjust the position of the first platform portion 12 and the second platform portion 14 relative to one another.

As depicted in FIG. 2, the first platform portion 12 includes an first end 180, an opposite second end 182, a first end portion 184 provided at and adjacent the first end 180, a second end portion 186 at and adjacent the second end 182, a fifth support portion 190 extending between the first end portion 184 and the second end portion 186, and a sixth support portion 192 extending between the first end portion 184 and the second end portion 186. The fifth support portion 190 and the sixth support portion 192 can each be formed, for example, as beams, rails, rods, or tubes having lengths extending between opposite ends thereof. The first end portion 184 can include an engagement portion 194 similar to that disclosed in U.S. Ser. No. 17/704,759, filed Mar. 25, 2022, for interfacing with portions of the robotic system R to facilitate interconnection of the first platform portion 12 with the robotic system R or the sub-system positioned relative to the robotic system.

Additionally, the first platform portion 12 can include a head support 196 and a chest support 198 similar to those also disclosed in U.S. Ser. No. 17/704,759, filed Mar. 25, 2022. The head support 196 and the chest support 198 are supported by and/or between the fifth support portion 190 and the sixth support portion 192, and the positions thereof can be adjusted relative to the fifth support portion 190 and the sixth support portion 192 to accommodate patients of different sizes. Furthermore, in addition to the head support 196 and the chest support 198, the first platform portion 12 can include a first arm support 200 supported by the fifth support portion 190 and a second arm support 202 supported by the sixth support portion 192.

The first platform portion 12 can be pivotally attached relative to the linkage portion 16. As depicted in FIGS. 3 and 4, the second end portion 186 can include a first extension portion 204 and a second extension portion 206 extending downwardly therefrom. The first extension portion 204 is provided adjacent the fifth support portion 190 and the second extension portion 206 is provided adjacent the sixth support portion 192. Each of the first extension portion 204 and the second extension portion 206 include a first leg portion 210 attached to the second end portion 186, and a second leg portion 212 extending outwardly from the first leg portion 210. First leg portions 210 can each be pivotally attached to the linkage portion 16 via receipt of pins 214 extending therethrough and into the end portion 158 of the linkage portion 16. And the first platform portion 12 can be fixed in a first pivotal position relative to the linkage portion 16 via receipt of removable pins 216 extending through the second leg portions 210 and into the end portion 158 of the linkage portion 16. When the removable pins 216 are removed, the first platform portion 12 can pivot relative to the linkage portion 16 (and the second platform portion 12) into various other pivotal positions. As discussed below, pivot movement afforded by the pivotal attachment of the first platform portion 12 relative to the linkage portion 16 allows the surgical gantry G to further articulate the position of the first platform portion 12 relative to the second platform portion 14.

After the surgical platform system 10 is initially positioned relative to the robotic system R (FIG. 10), and thereafter, the tongue portion 46 is received in the receiving area $A_1$, the engagement portion 194 can be engaged to a complimentary engagement portion 220 similar to that disclosure in U.S. Ser. No. 17/704,759, filed Mar. 25, 2022, provided on the robotic system R or the sub-system positioned relative to the robotic system R. As depicted in FIG. 10, the complimentary engagement portion 220 is provided on the gantry G. With surgical platform system 10 interconnected (FIGS. 11-16) with the gantry G via engagement of the engagement portion 194 with the complimentary engagement portion 220, the surgical platform portion 10 can work together with portions of the gantry 10 to articulate the first platform portion 12 and the second platform portion 14 relative to position and orient the patient P relative to the robotic system R.

Figure 14:
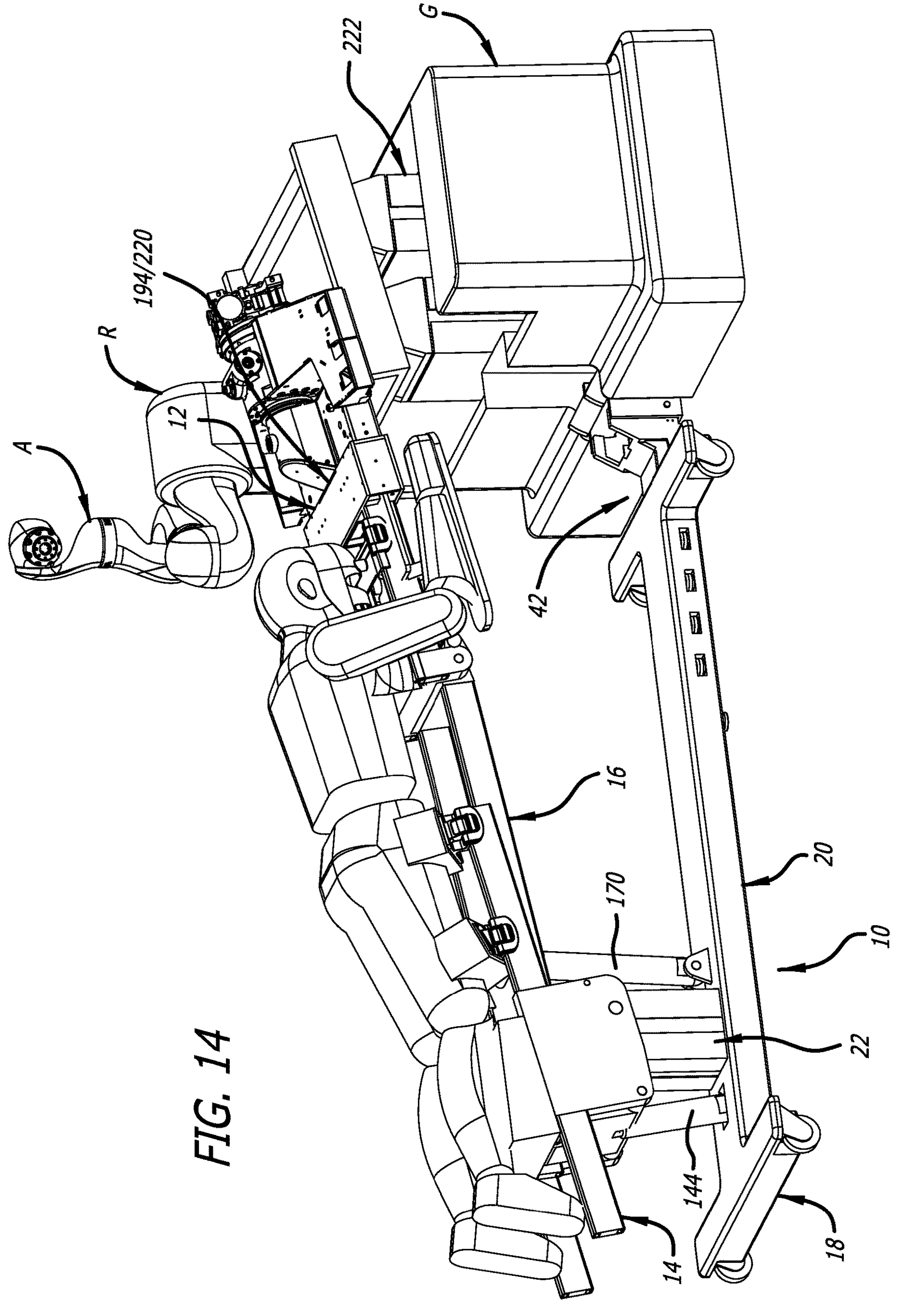
FIG. 14 is a side, top, perspective view of the surgical platform system of FIG. 1 interconnected relative to the gantry of FIG. 10 with portions of the surgical platform system and the gantry oriented to position the patient in a Reverse-Trendelenburg position.
Figure 15:
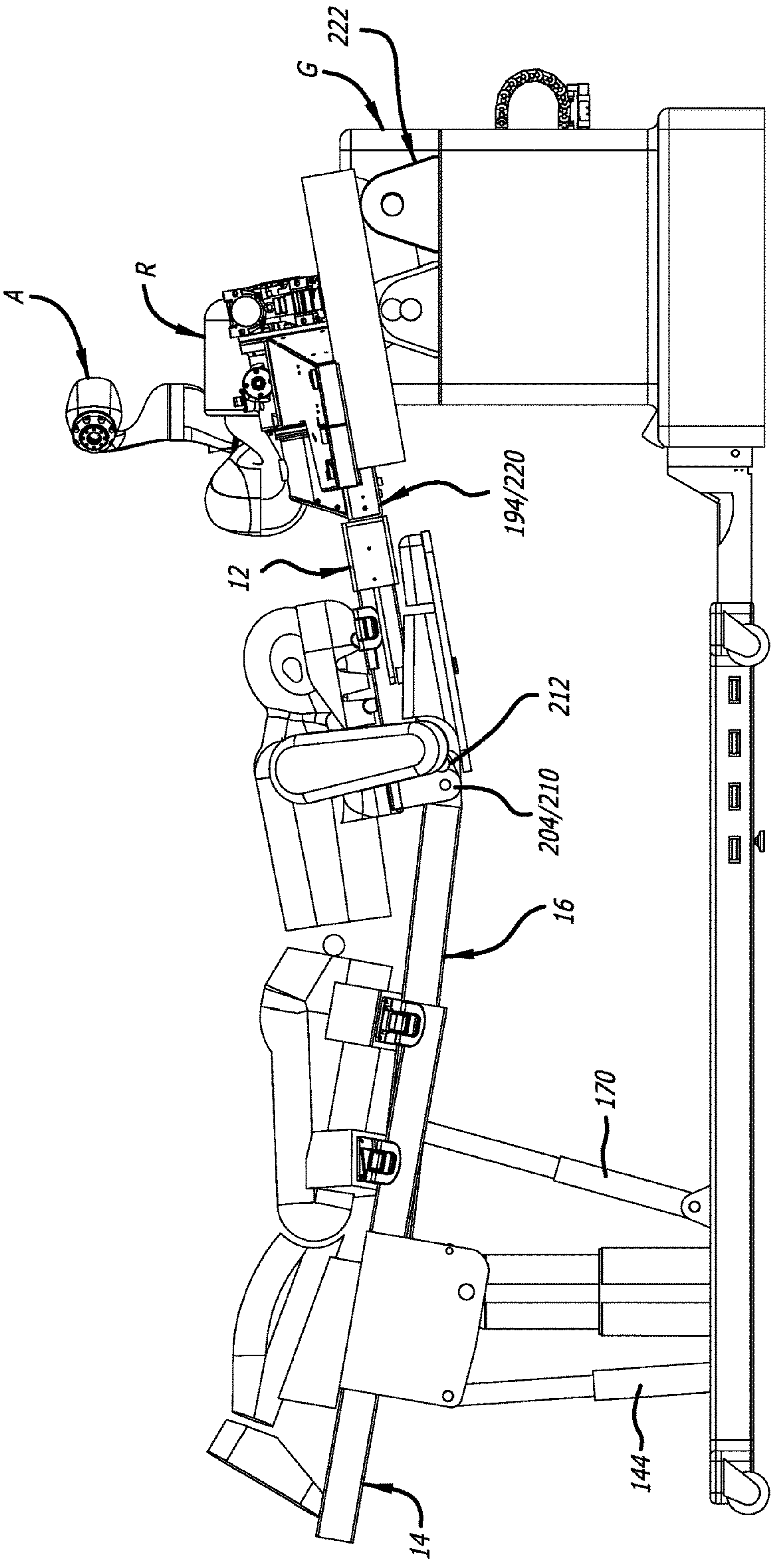
FIG. 15 is a first lateral side, elevational view of the surgical platform system of FIG. 1 with the portions of the surgical platform and the gantry oriented to subject the patient's spine to extension.
Figure 16:
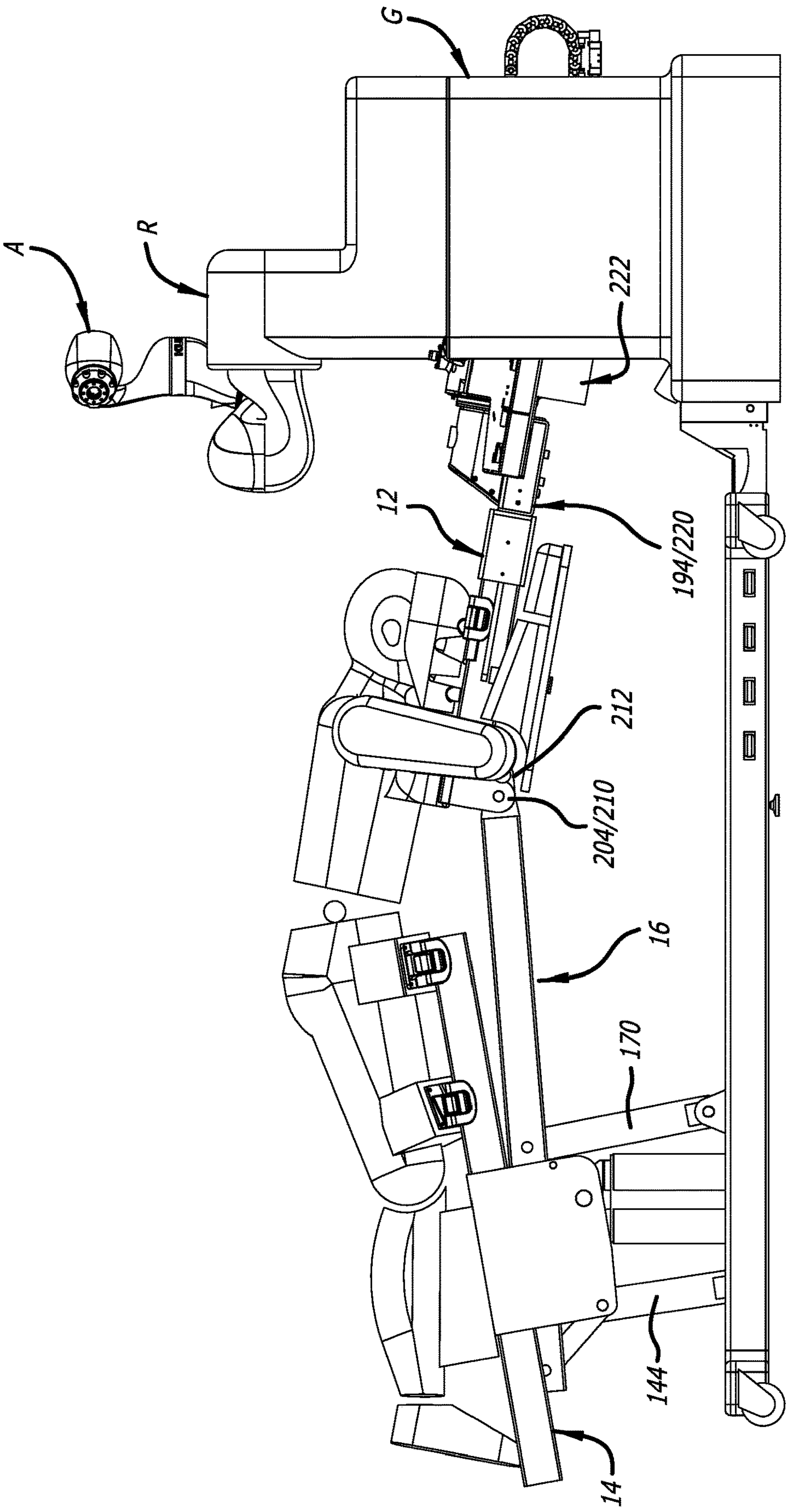
FIG. 16 is a first lateral side, elevational view of the surgical platform system of FIG. 1 with the portions of the surgical platform and the gantry oriented to subject the patient's spine to flexion.

As depicted in FIG. 10-16, the gantry G can include a platform manipulator 222 supporting the complimentary engagement portion 220 and positioned above the tongue portion 46. The platform manipulator 222 can be used in raising, lowering, and tilting (upwardly or downwardly) portions of the first platform portion 12 relative to the second platform portion 14. To illustrate, when the surgical platform system 10 is interconnected with the gantry G, and the first platform portion 12 is in the first pivotal position relative to the linkage portion, the surgical platform system 10 and the platform manipulator 222 can be operated in a coordinated fashion to position/orient the first platform portion 12 and the second platform portion 14 so that the patient P is moved into the Trendelenburg position (FIG. 13) and the Reverse-Trendelenburg position (FIG. 14). In doing so, the platform manipulator 222 can be used in tilting the first platform portion 12 adjacent the first end 180 downwardly form the Trendelenburg position or upwardly for the Reverse-Trendelenburg position. When the removable pins 216 are removed to allow the first platform portion 12 to pivot relative to the linkage portion 16, the surgical platform system 10 and the platform manipulator 222 can be operated in a coordinated fashion (via use of the controller or controllers of the surgical platform system 10 and/or the robotic system R) to position/orient the first platform portion 12 and the second platform portion 14 so that the patient P is subjected to extension (FIG. 15) or flexion (FIG. 16). In doing so, the platform manipulator 222 can be used in tilting the first platform portion 12 adjacent the first end 180 upwardly to facilitate subjecting the patient's spine to extension or downwardly to facilitate subjecting the patient's spine to flexion. Thus, operation of the surgical platform system 10 and the platform manipulator 222 can be used to position/orient and reposition/reorient the patient's body with respect to the robotic arm A, and the robotic arm A can be used for performing surgery or facilitating performance of surgery on the patient P.

Figure 22:
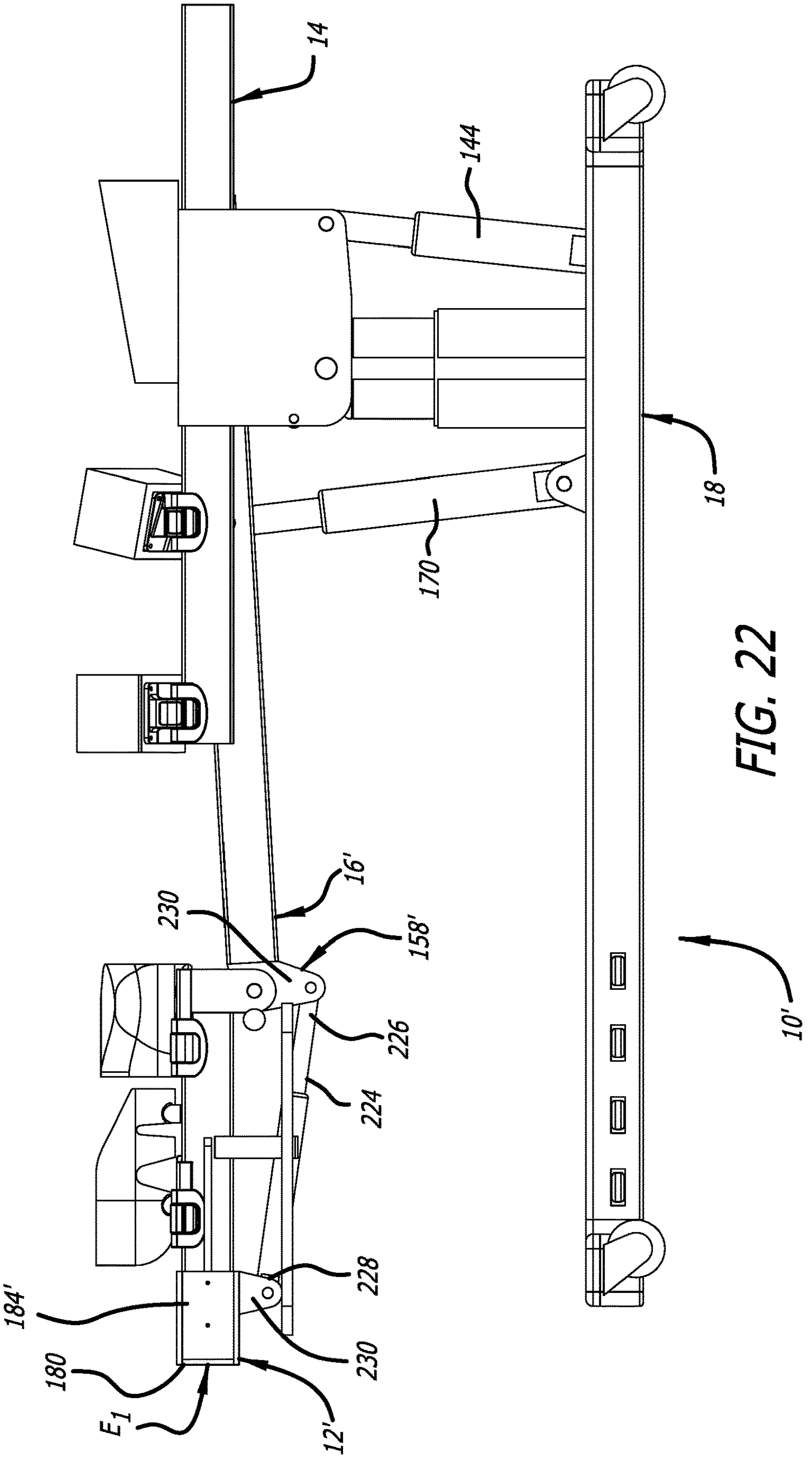
FIG. 22 is a second lateral side, elevational view of an additional embodiment of a surgical platform system according to the present disclosure.
Figure 23:
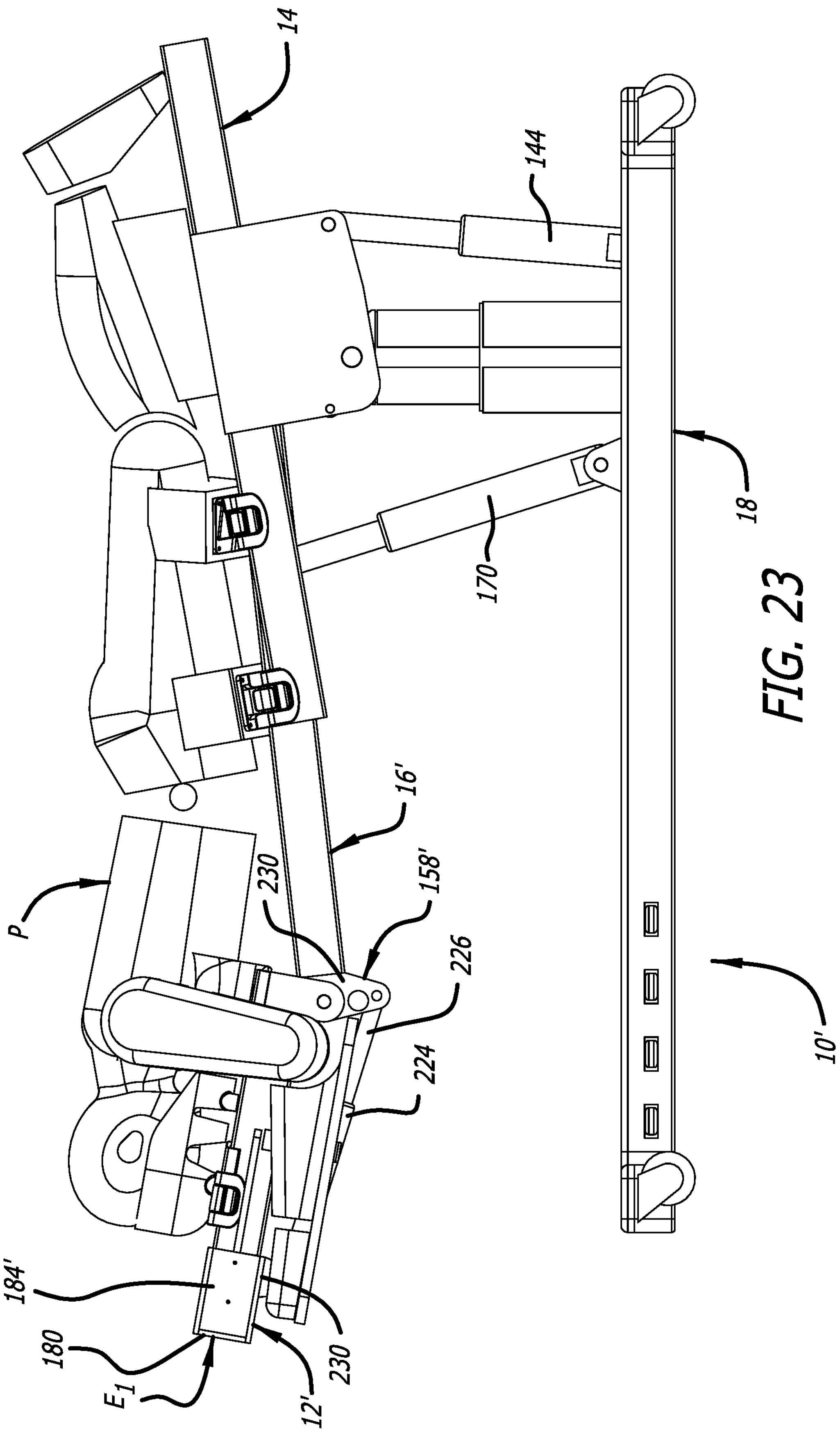
FIG. 23 is a second lateral side, elevational view of the surgical platform system of FIG. 22 with the patient positioned thereon including portions thereof oriented to subject the patient's spine to extension.
Figure 24:
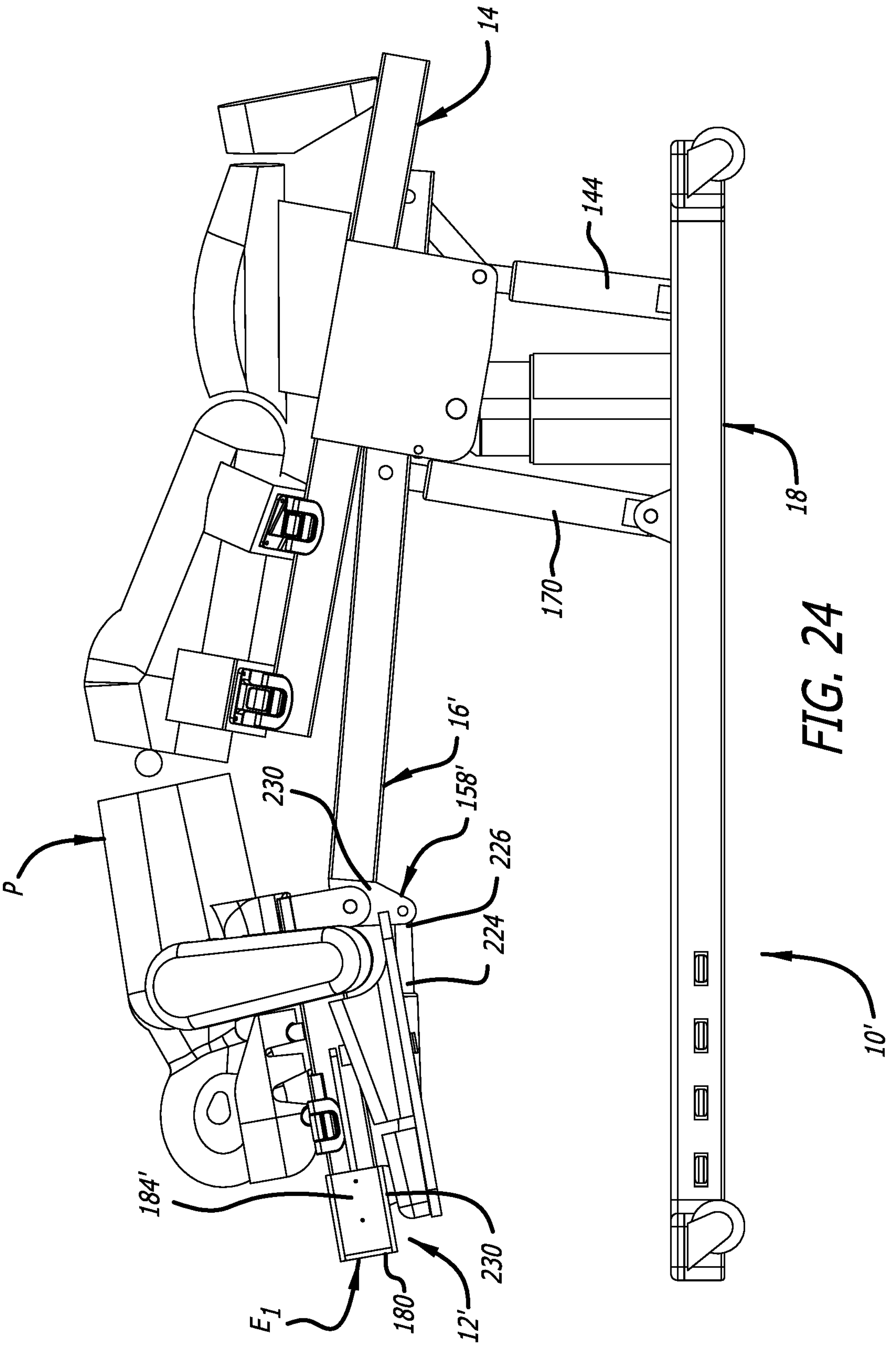
FIG. 24 is a second lateral side, elevational view of the surgical platform system of FIG. 22 with the patient positioned thereon including portions thereof oriented to subject the patient's spine to flexion.

Another embodiment of the surgical platform system 10' can be configured to facilitate pivoting of a first platform portion 12' relative to a linkage portion 16'. As depicted in FIGS. 22-24, the surgical platform system 10' includes similar features to the surgical platform system 10, and like numerals are used to in describing these similar features. Unlike the surgical platform system 10, the surgical platform system 10' includes a modified end portion 158' of the linkage portion 16, a modified first end portion 184' of the first platform portion 12', and a fourth actuator 224 extending between the modified end portion 158' and the modified first end portion 184'.

Like the first platform portion 12 and the linkage portion 16, the first platform portion 12 is pivotally attached to the linkage portion 16. And the fourth actuator 224 is actuatable (via expansion and contraction thereof) between at least a first position (FIG. 23) and a second position (FIG. 24) to pivotal the first platform portion 12' relative to the linkage portion 16'. The fourth actuator 224 has a first end 226 pivotally attached to the modified end portion 158', and a second end 228 pivotally attached to the modified first end portion 184'. The modified end portion 158' and the modified first end portion 184' can each include a clevis 230 facilitating pivotal attachment, respectively, of the first end 226 and the second end 228. Actuation of the fourth actuator 224 pivots the first platform portion 12' relative to the linkage portion 16' and tips the first end 180 of the first platform portion 12' upwardly (FIG. 23) or downwardly (FIG. 24). Such upward and downward movement of the first end 180 of the first platform portion 12' along with coordinated movement of other portions of the surgical platform 10' can be used to subject the patient's spine to extension (FIG. 23) and flexion (FIG. 24). The operation of the fourth actuator 224 can be coordinated with operation of the first actuator 144, the second actuator 162, and/or the third actuator 170 using the controller or controllers of the surgical platform system 10 and/or the robotic system R).

It should be understood that various aspects disclosed herein may be combined in different combinations than the combinations specifically presented in the description and the accompanying drawings. It should also be understood that, depending on the example, certain acts or events of any of the processes of methods described herein may be performed in a different sequence, may be added, merged, or left out altogether (e.g., all described acts or events may not be necessary to carry out the techniques). In addition, while certain aspect of this disclosure are described as being performed by a single module or unit for purposes of clarity, it should be understood that the techniques of this disclosure may be performed by a combination of units or modules associated with, for example, a medical device.

We claim:

1. A surgical platform system facilitating manipulation of a patient supported thereby, the surgical platform system comprising:

a support portion including a horizontally-oriented portion and a vertically-oriented portion, the horizontally-oriented portion having a first end, an opposite second end, a first end portion at the first end, a second end portion at the second end, and a cross member extending between the first end portion and the second end portion, and the vertically-oriented portion including a column portion supported by the horizontally-oriented portion, the column portion spacing a first platform portion, a second platform portion, and a linkage portion of the surgical platform system from the horizontally-oriented portion, the linkage portion including a first base portion positioned on a first side of the column portion, a second base portion positioned on a second side of the column portion, a first connector extending between the first base portion and the second base portion, and a first support portion and a second support portion supported at least in part by the first connector, the first base portion and the second base portion being pivotally attached relative to the column portion, and the second platform portion being supported by the first base portion and the second base portion, the first connector having a first end and an opposite second end, the first end of the first connector being pivotally attached relative to the first base portion and the second base portion, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion;

the first platform portion including first patient support portions for supporting portions of the patient's head and upper torso; and the second platform portion including second patient support portions for supporting portions of the patient's legs;

wherein the first platform portion is pivotal relative to the first base portion and the second base portion via pivotal movement of the first connector;

wherein the second platform portion is pivotal relative to the column portion via pivotal movement of the first base portion and the second base portion; and wherein pivotal movement of the first platform portion relative to the first base portion and the second base portion and pivotal movement of the second platform portion relative to the column portion serve to separately articulate the first platform portion and the second platform portion relative to one another.

2. The surgical platform system of claim 1, further comprising a first actuator extending between the horizontally-oriented portion and the first connector, the first actuator being actuatable to expand and contract to pivot the first base portion, the second base portion, and the second platform portion relative to the column portion.

3. The surgical platform system of claim 1, wherein the second ends of the first support portion and the second support portion are pivotally attached to the second end of the first connector.

4. The surgical platform system of claim 3, further comprising a first actuator extending between the horizontally-oriented portion and a second connector attached between the first support portion and the second support portion, the first actuator being actuatable to expand and contract to pivot the first support portion and the second support portion relative to the first connector.

5. The surgical platform system of claim 4, further comprising a second actuator extending between the second end of the first connector and a third connector attached between the first base portion and the second base portion, the second actuator being actuatable to expand and contract to pivot the first connector relative to the first base portion and the second base portion.

6. The surgical platform system of claim 1, further comprising a first actuator extending between the horizontally-oriented portion and the first connector, a second actuator extending between the horizontally-oriented portion and a second connector attached between the first support portion and the second support portion, and a third actuator extending between the second end of the first connector and a third connector attached between the first base portion and the second base portion, the first actuator being actuatable to expand and contract to pivot the first base portion, the second base portion, and the second platform portion relative to the column portion, the second actuator being actuatable to expand and contract to pivot the first support portion and the second support portion relative to the first connector; and the third actuator being actuatable to expand and contract to pivot the first connector relative to the first base portion and the second base portion.

7. The surgical platform system of claim 6 in combination with a robotic system, further comprising:

the robotic system including a gantry having a platform manipulator and an engagement portion supported by the platform manipulator; and the first platform portion including a first end and an opposite second end, the first end of the first platform portion including a complimentary engagement portion for engaging the engagement portion of the gantry, and the second end of the first platform portion being attached to the first ends of the first support portion and the second support portion;

wherein, when the engagement portion and the complimentary engagement portion are engaged to one another, the surgical platform system is interconnected with the gantry, and the first actuator, the second actuator, the third actuator, and the platform manipulator can be actuated to position/orient the patient supported by the first platform portion and the second platform portion relative to the robotic system.

8. The combination of the surgical platform system and the robotic system of claim 7, wherein the second end of the first platform portion is pivotally attached to the first ends of the first support portion and the second support portion, and wherein the first actuator, the second actuator, the third actuator, and the platform manipulator can be actuated to pivot the first platform portion and the second platform portion relative to one another.

9. The surgical platform system of claim 1, wherein the column portion is telescopically expandable and contractable between a contracted first position and an expanded second position to raise and lower the first platform portion, the second platform portion, and the linkage portion relative to the horizontally-oriented portion.

10. A surgical platform system facilitating manipulation of a patient supported thereby, the surgical platform system comprising:

a horizontally-oriented portion and a vertically-oriented portion, the horizontally-oriented portion supporting the vertically-oriented portion, and the vertically-oriented portion including a column portion spacing a first platform portion, a second platform portion, and a linkage portion of the surgical platform system from the horizontally-oriented portion, the linkage portion including a base pivotally attached to the vertically-oriented portion, a first connector supported by the base, and a first support portion and a second support portion supported at least in part by the first connector, the second platform portion being supported by the base, the first connector having a first end and an opposite second end, the first end of the first connector being pivotally attached relative to the base, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion;

the first platform portion including first patient support portions for supporting portions of the patient's head and upper torso; and the second platform portion including second patient support portions for supporting portions of the patient's legs;

wherein the first platform portion is pivotal relative to the base via pivotal movement of the first connector;

wherein the second platform portion is pivotal relative to the column portion via pivotal movement of the base; and wherein pivotal movement of the first platform portion relative to the base and pivotal movement of the second platform portion relative to the column portion serve to separately articulate the first platform portion and the second platform portion relative to one another.

11. The surgical platform system of claim 10, further comprising a first actuator extending between the horizontally-oriented portion and the first connector, the first actuator being actuatable to expand and contract to pivot the base and the second platform portion relative to the column portion.

12. The surgical platform system of claim 10, wherein the second ends of the first support portion and the second support portion are pivotally attached to the second end of the first connector.

13. The surgical platform system of claim 12, further comprising a first actuator extending between the horizontally-oriented portion and a second connector attached between the first support portion and the second support portion, the first actuator being actuatable to expand and contract to pivot the first support portion and the second support portion relative to the first connector.

14. The surgical platform system of claim 13, further comprising a second actuator extending between the second end of the first connector and a third connector attached between portions of the base, the second actuator being actuatable to expand and contract to pivot the first connector relative to the base.

15. The surgical platform system of claim 10, further comprising a first actuator extending between the horizontally-oriented portion and the first connector, a second actuator extending between the horizontally-oriented portion and a second connector attached between the first support portion and the second support portion, and a third actuator extending between the second end of the first connector and a third connector attached between portions of the base, the first actuator being actuatable to expand and contract to pivot the base and the second platform portion relative to the column portion, the second actuator being actuatable to expand and contract to pivot the first support portion and the second support portion relative to the first connector; and the third actuator being actuatable to expand and contract to pivot the first connector relative to the base.

16. The surgical platform system of claim 15 in combination with a robotic system, further comprising:

the robotic system including a gantry having a platform manipulator and an engagement portion supported by the platform manipulator; and the first platform portion including a first end and an opposite second end, the first end of the first platform portion including a complimentary engagement portion for engaging the engagement portion of the gantry, and the second end of the first platform portion being attached to the first ends of the first support portion and the second support portion;

wherein, when the engagement portion and the complimentary engagement portion are engaged to one another, the surgical platform system is interconnected with the gantry, and the first actuator, the second actuator, the third actuator, and the platform manipulator can be actuated to position/orient the patient supported by the first platform portion and the second platform portion relative to the robotic system.

17. The combination of the surgical platform system and the robotic system of claim 16, wherein the second end of the first platform portion is pivotally attached to the first ends of the first support portion and the second support portion, and wherein the first actuator, the second actuator, the third actuator, and the platform manipulator can be actuated to pivot the first platform portion and the second platform portion relative to one another.

18. The surgical platform system of claim 10, wherein vertically-oriented portion includes a column portion, and the column portion is telescopically expandable and contractable between a contracted first position and an expanded second position to raise and lower the first platform portion, the second platform portion, and the linkage portion relative to the horizontally-oriented portion.

19. A surgical platform system facilitating manipulation of a patient supported thereby, the surgical platform system comprising:

a support supporting a linkage portion, a first support platform, and a second support platform relative to the ground, the linkage portion including a base pivotally attached to the support, a first connector supported by the base, and a first support portion and a second support portion supported at least in part by the first connector, the second platform portion being supported by the base, the first connector having a first end and an opposite second end, the first end of the first connector being pivotally attached relative to the base, and the first support portion and the second support portion each including a first end and an opposite second end, the first support portion and the second support portion being attached adjacent the second ends thereof to the second end of the first connector, and the first platform portion being supported by the linkage portion adjacent the first ends of the first support portion and the second support portion;

the first platform portion including first patient support portions for supporting portions of the patient's head and upper torso; and the second platform portion including second patient support portions for supporting portions of the patient's legs;

wherein the first platform portion is pivotal relative to the base via pivotal movement of the first connector;

wherein the second platform portion is pivotal relative to the support via pivotal movement of the base; and wherein pivotal movement of the first platform portion relative to the base and pivotal movement of the second platform portion relative to the support serve to separately articulate the first platform portion and the second platform portion relative to one another.

20. The surgical platform system of claim 19 in combination with a robotic system, further comprising:

the robotic system including a gantry having a platform manipulator and an engagement portion supported by the platform manipulator; and the first platform portion including a first end and an opposite second end, the first end of the first platform portion including a complimentary engagement portion for engaging the engagement portion of the gantry, and the second end of the first platform portion being attached to the first ends of the first support portion and the second support portion;

wherein, when the engagement portion and the complimentary engagement portion are engaged to one another, the surgical platform system is interconnected with the gantry, and the first platform portion and the second platform portion are manipulatable relative to one another to position/orient the patient supported by the first platform portion and the second platform portion relative to the robotic system.

* * * * *